United States Patent [19]

Ishii et al.

[11] Patent Number: 5,347,545
[45] Date of Patent: Sep. 13, 1994

[54] MULTI-TERMINAL COMMUNICATION EQUIPMENT FOR SMOOTHLY AND CORRECTLY COMMUNICATING DATA BETWEEN A PLURALITY OF TERMINAL EQUIPMENTS

[75] Inventors: Tomoyuki Ishii; Nobuyoshi Kondo, both of Kawasaki, Japan

[73] Assignee: Fujitsu Limited, Kawasaki, Japan

[21] Appl. No.: 825,507

[22] Filed: Jan. 24, 1992

[30] Foreign Application Priority Data

Jan. 25, 1991 [JP] Japan .................................. 3-7691
Nov. 1, 1991 [JP] Japan .................................. 3-287796

[51] Int. Cl.⁵ ........................................... H04L 27/00
[52] U.S. Cl. ................................... 375/37; 340/825.04
[58] Field of Search ................... 375/36, 38, 107, 109; 340/825.06, 825.04, 825.05; 370/85, 101, 93; 455/38.1, 70, 227, 228, 229

[56] References Cited

U.S. PATENT DOCUMENTS 4,599,617 7/1986 Stolpman .......................... 343/7.3
5,185,736 2/1993 Tyrrell et al. ...................... 370/55

*Primary Examiner*—Stephen Chin
*Attorney, Agent, or Firm*—Staas & Halsey

[57] ABSTRACT

A multiple-terminal communication equipment comprises a data communication unit, an information processing unit, and a data input/output unit, for realizing radio communication between at least two terminals. The multiple-terminal communication equipment transmits, before transmitting data from one terminal, a transmission disabling code for disabling data transmission of the other terminals, and after completely transmitting the data from the one terminal, a transmission enabling code for canceling the transmission disabled states of the other terminals. This arrangement is capable of smoothly and correctly communicating data between a plurality of terminal equipments.

28 Claims, 30 Drawing Sheets

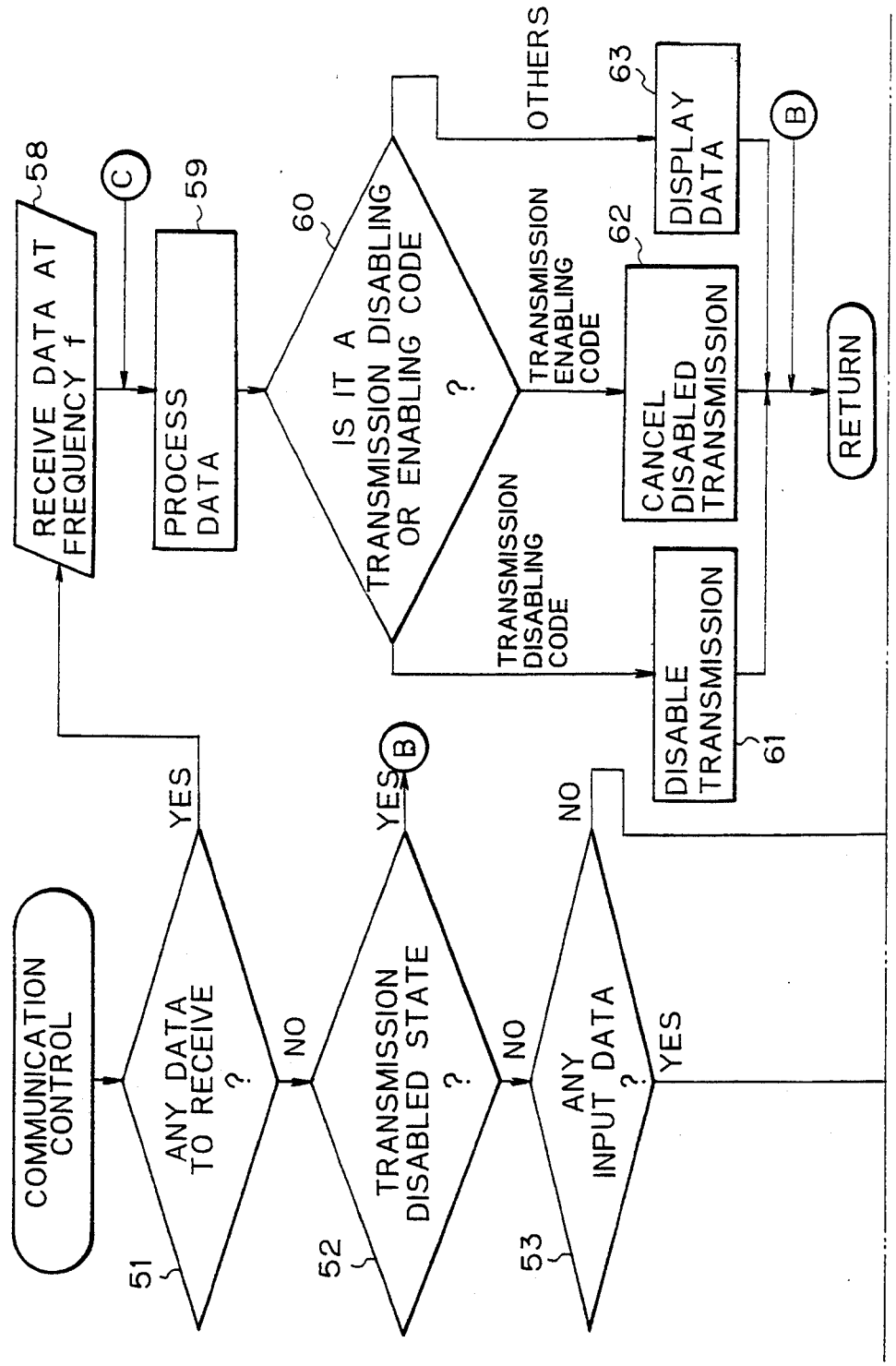

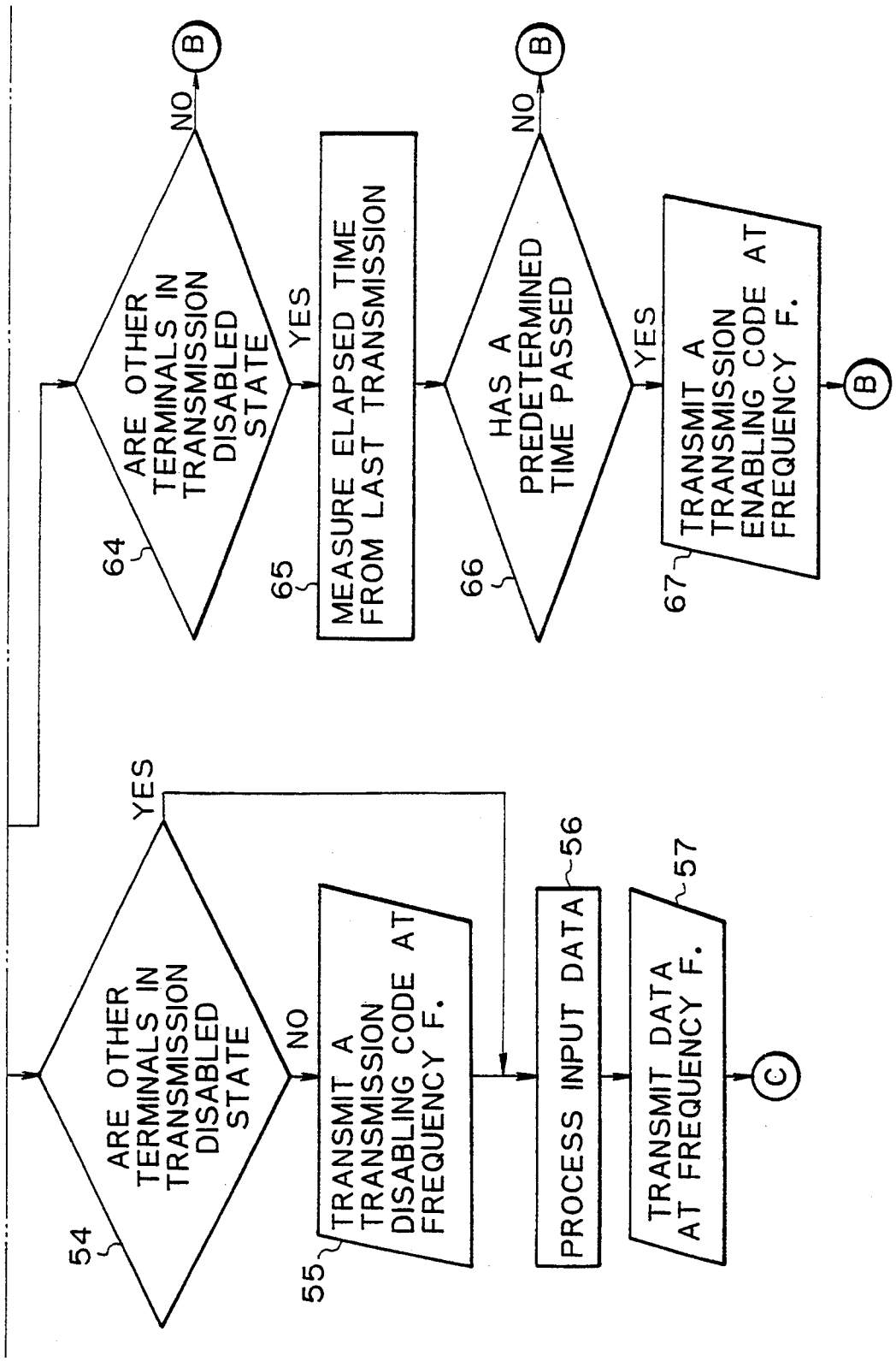

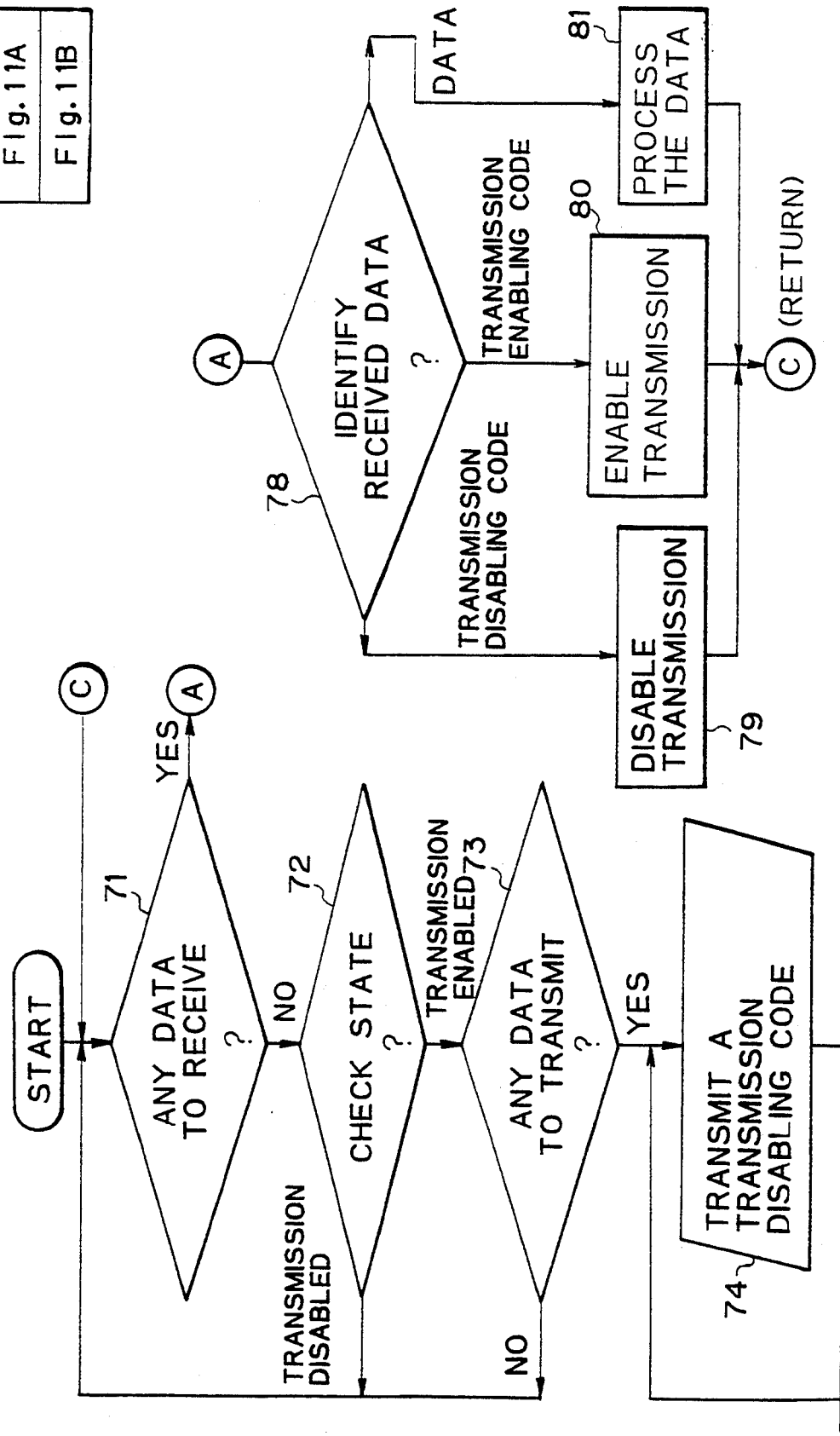

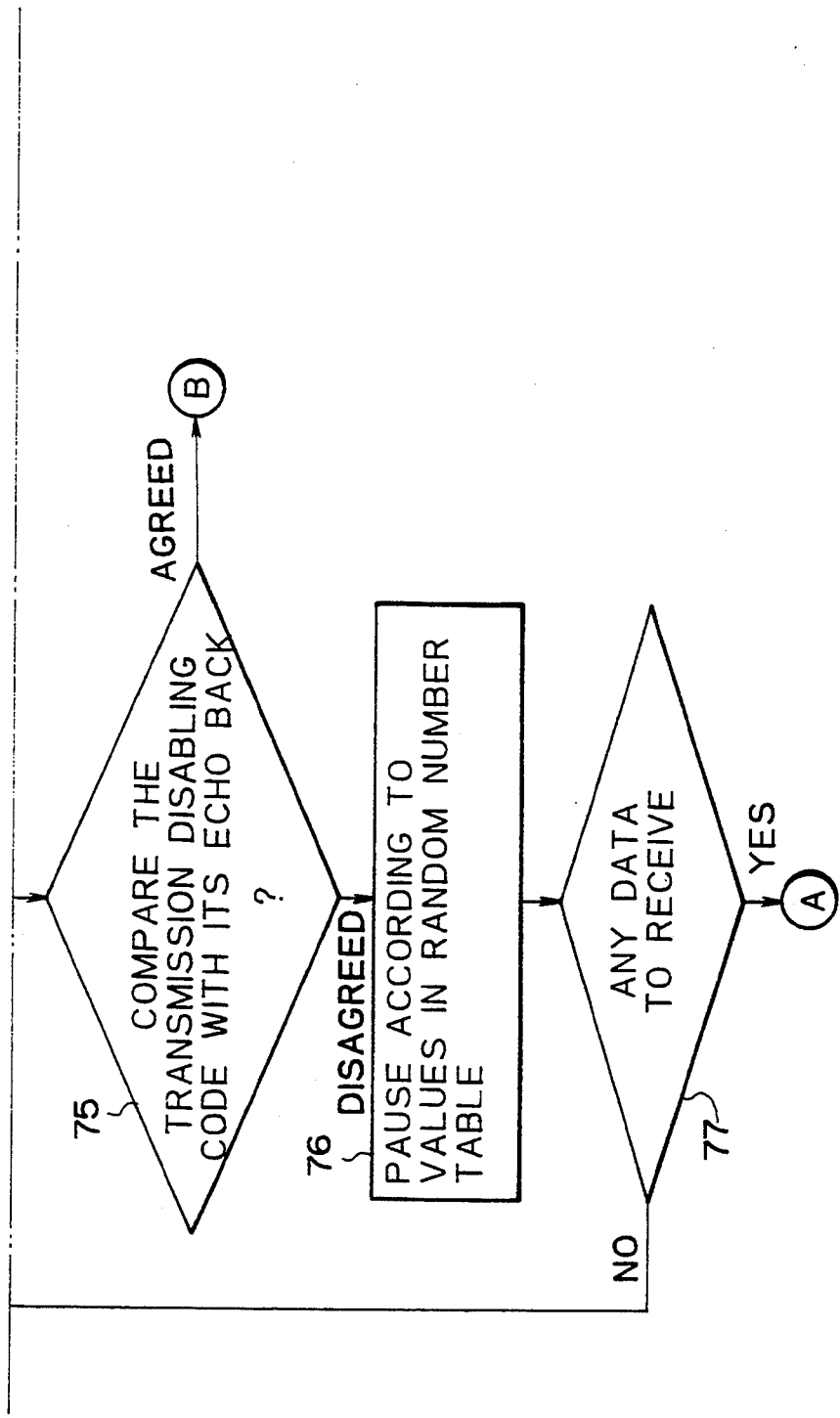

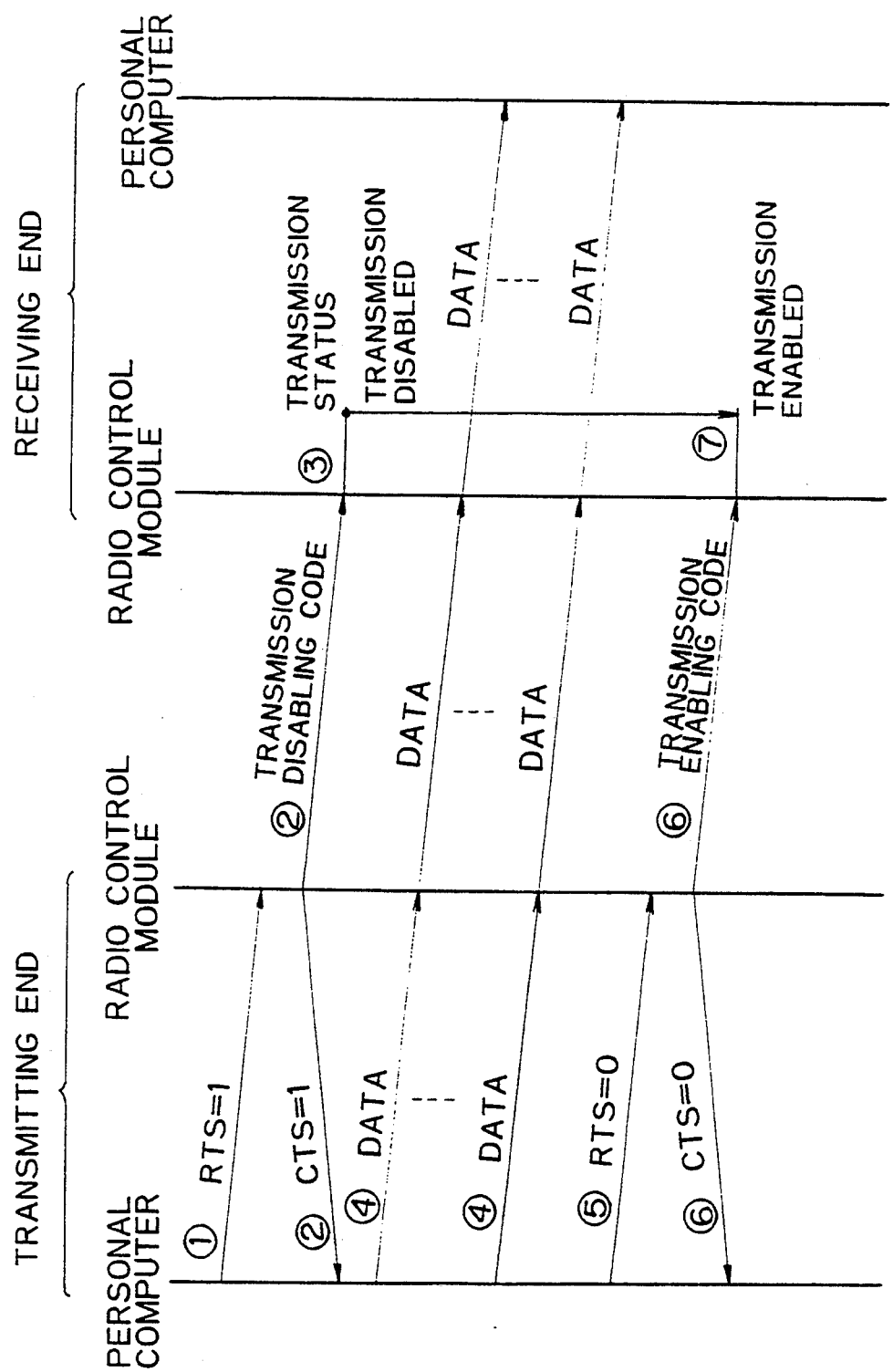

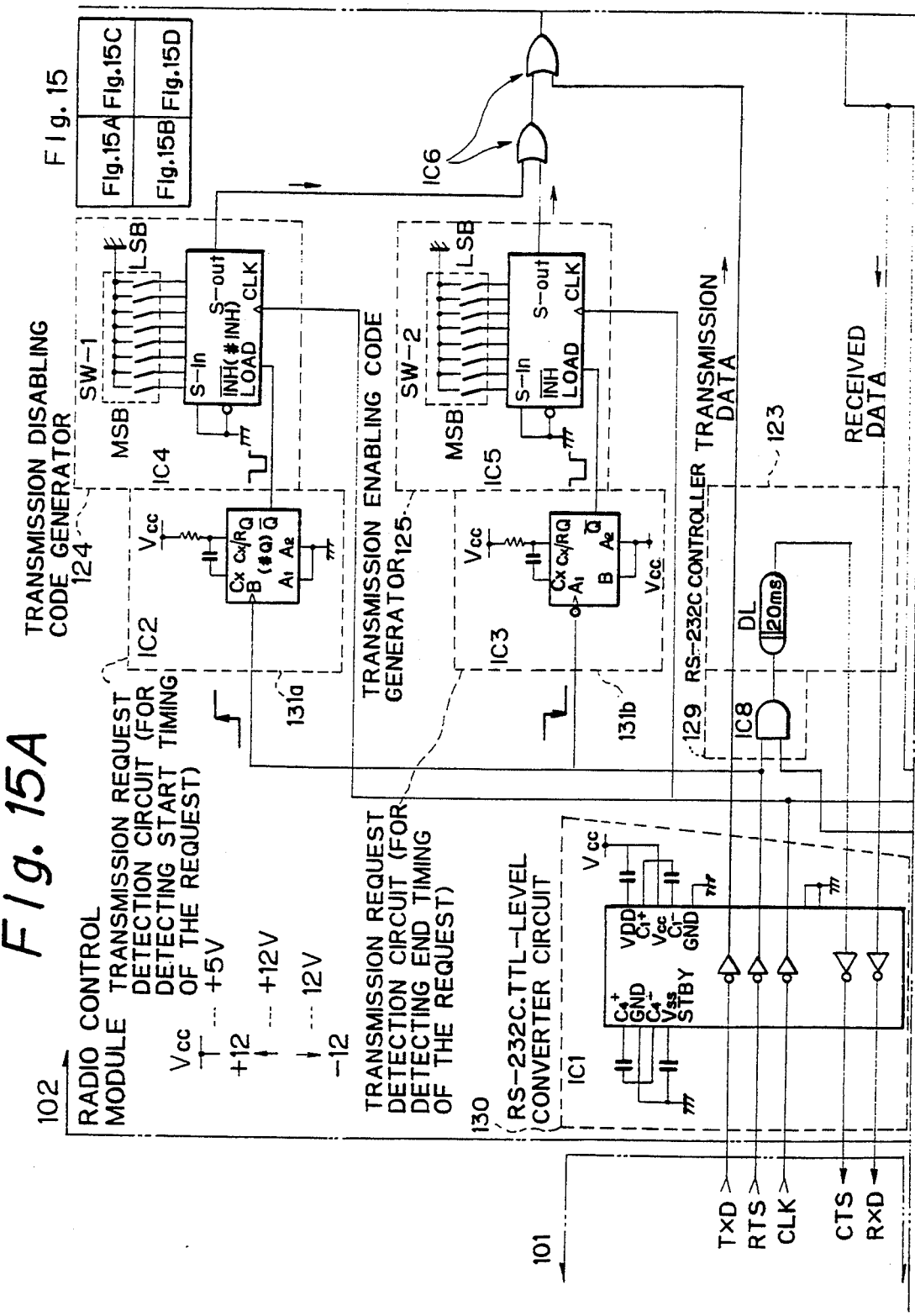

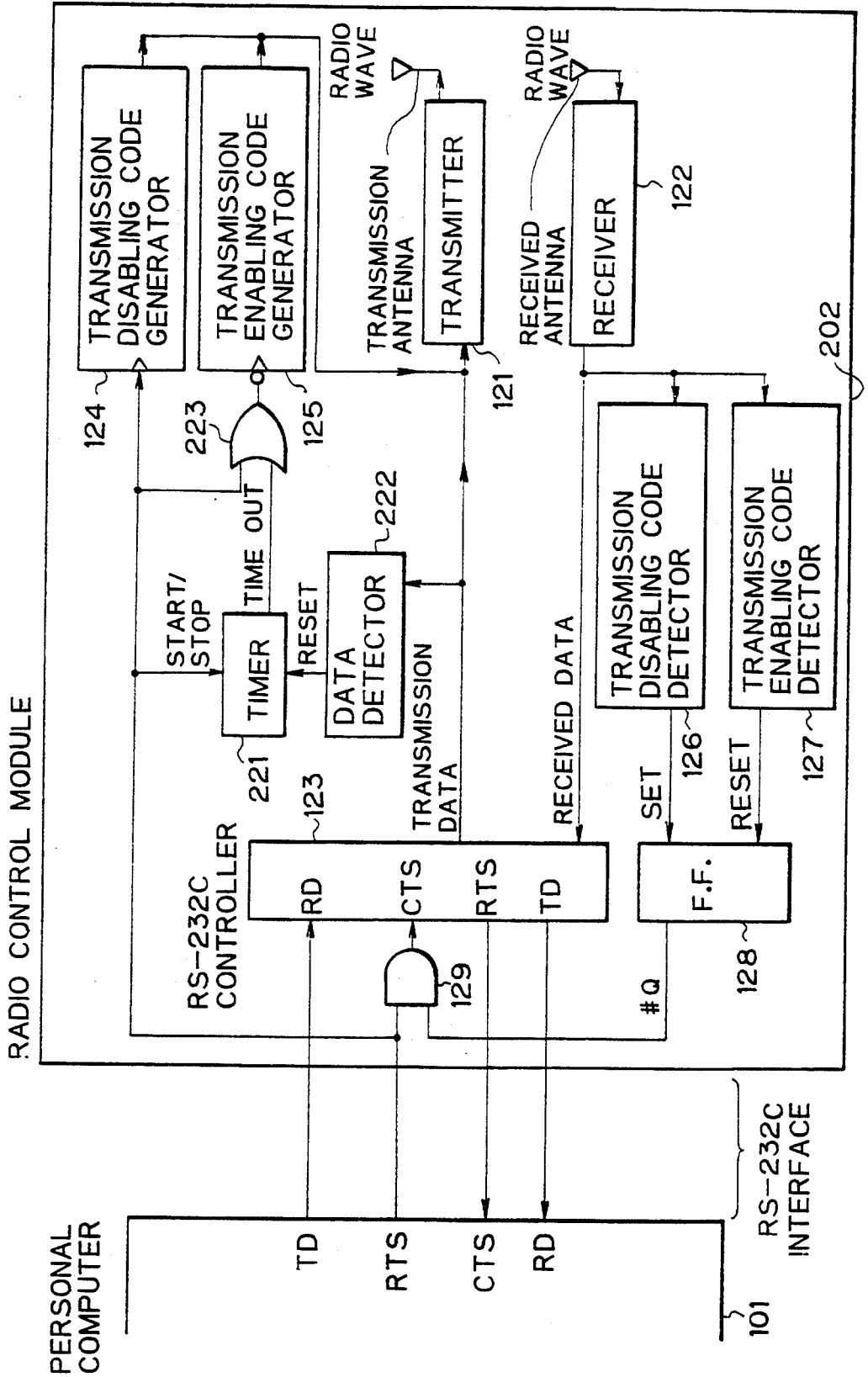

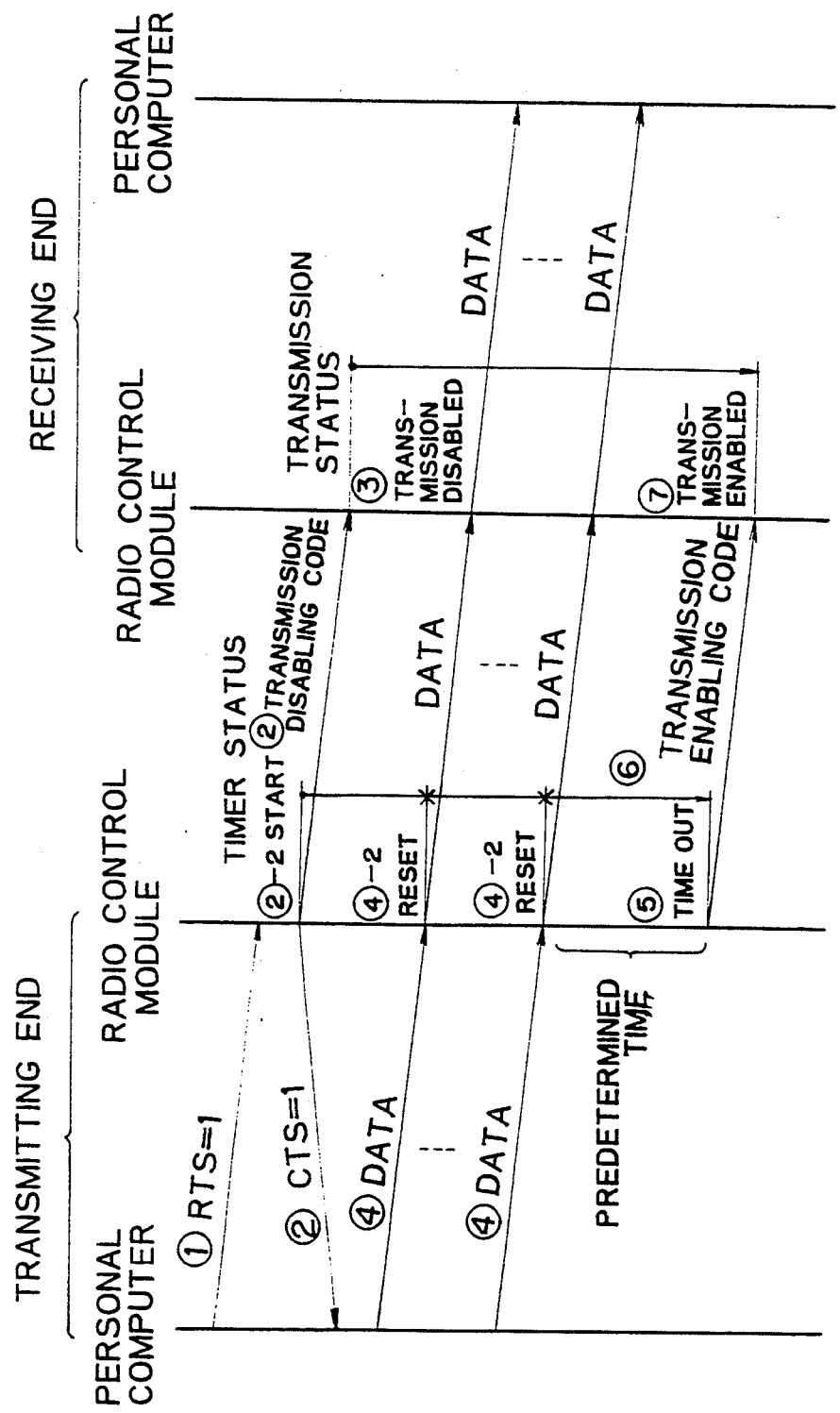

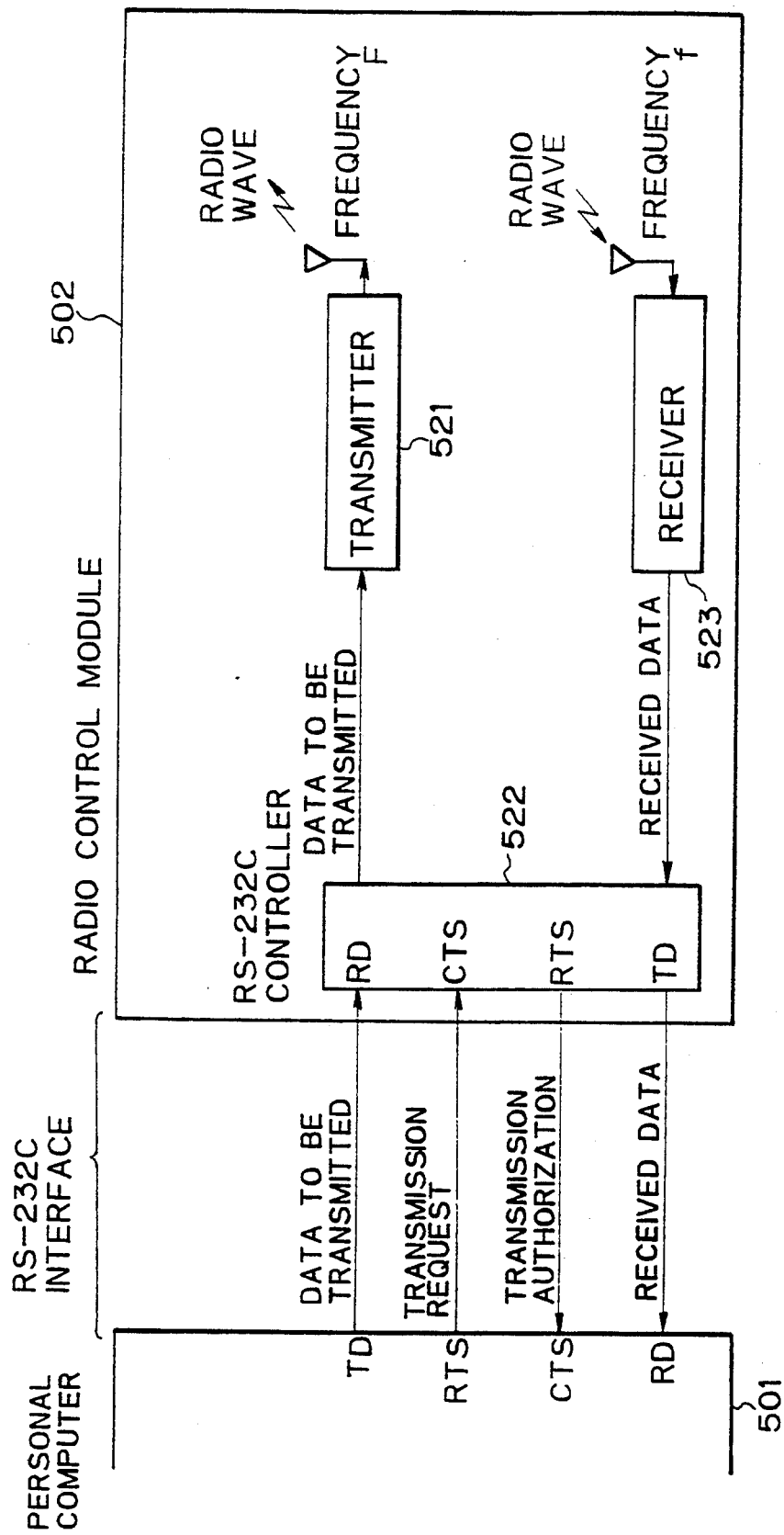

MULTI-TERMINAL COMMUNICATION EQUIPMENT FOR SMOOTHLY AND CORRECTLY COMMUNICATING DATA BETWEEN A PLURALITY OF TERMINAL EQUIPMENTS

BACKGROUND OF THE INVENTION

1. Field of the Invention

The present invention relates to a multiple-terminal communication system, and more particularly, to a multiple-terminal communication system for realizing radio communication between a plurality of radio terminal equipment such as personal computers.

2. Description of the Related Art

Recently, two-way communication is frequently carried out between a plurality of terminal equipment such as personal computers. The two-way communication with personal computers can realize a teleconference. Under these circumstances, it is required to provide a multiple-terminal communication system that can smoothly and correctly communicate data between the personal computers (terminal equipment).

Further, data communication between terminal equipments such as personal computers is carried out through a wired network such as a LAN (Local Area Network), or a radio network. In any case, each terminal equipment unit must have transmission and reception frequencies, so that the number of frequency channels required for terminal communications will be at least twice the number of the terminal equipment. To form a teleconference system with terminal equipment such as personal computers, RS-232C interfaces are usually employed. Further, a module (a radio control module) may be attached to the RS-232C interface of a communication terminal equipment unit such as a personal computer, to provide the terminal equipment unit with a radio communication function.

Generally, a pair of such radio communication terminals carries out full-duplex communication with the use of two different frequencies because the RS-232C interface is constituted for one-to-one communication. In an exceptional case, however, a specific terminal may be used exclusively as a transmission terminal, and another or more terminals as reception-only terminals, to carry out one-way communication without interface control. This may be the case of a broadcasting station that transmits information to many domestic receivers. In this case, each receiver cannot transmit data because it will be uncontrollable if a plurality of receivers simultaneously transmit data.

As described above, the conventional wired technique such as the LAN for communicating data between terminal equipment requires enormous costs for laying circuits and cables for connecting the equipment. This is the reason why the wired technique is not widely used. Further, on the other hand, the conventional wireless technique for communicating data between terminal equipment requires, for example, radio frequency channels of more than twice the number of the terminal equipment units. In addition, the number of the terminal equipment is not easily expanded because frequencies handled by a repeater are limited. Since usable radio frequencies are limited, it is not economical to employ many frequencies for communications within one group.

SUMMARY OF THE INVENTION

An object of the present invention is to provide a multiple-terminal communication system that can smoothly and correctly communicate data between a plurality of terminal equipment units.

According to the present invention, there is provided a multiple-terminal communication equipment system comprising a data communication unit, an information processing unit, and a data input/output unit, for realizing radio communication between at least two terminals, characterized by transmitting, before transmitting data from one terminal, a transmission disabling code for disabling data transmission of the other terminals, and after completely transmitting the data from the one terminal, a transmission enabling code for canceling the transmission disabled states of the other terminals.

The transmission enabling code may be transmitted when no transmission data is generated for a predetermined time during a data transmission operation. The transmission disable state of the current multiple-terminal communication equipment may be canceled when there is no data to receive for a predetermined time after the reception of the transmission disabling code or last data, during a data receiving operation.

The data communication unit may use the same frequency for data transmission and reception. The data communication unit may use different frequencies for data transmission and reception, respectively.

According to the present invention, there is also provided a radio communication system having a plurality of multiple-terminal communication equipment, wherein each of the multiple-terminal communication equipment comprises a data communication unit, an information processing unit, and a data input/output unit, for realizing radio communication between at least two terminals, characterized by transmitting, before transmitting data from one terminal, a transmission disabling code for disabling data transmission of the other terminals, and after completely transmitting the data from the one terminal, a transmission enabling code for canceling the transmission disabled states of the other terminals.

Each of the multiple-terminal communication equipment units may transmit data at a predetermined frequency, receive and monitor the transmitted data at the predetermined frequency through a reception unit, compare the received data with the transmitted data, and evaluate communication conditions between the own multiple-terminal communication equipment and the other multiple-terminal communication equipment. Each of the multiple-terminal communication equipment may have a different random number table, determine a delay time according to values in the random number table if an interference with another multiple-terminal communication equipment is detected, and again transmit data after the delay time.

Each of the multiple-terminal communication equipment may receive checking data transmitted from itself or another multiple-terminal communication equipment while no data communication is being carried out between the multiple-terminal communication equipment, and according to the checking data, evaluate data transmission conditions between the own multiple-terminal communication equipment and the other multiple-communication equipment.

The data communication unit may use different frequencies for data transmission and reception, respectively. The multiple-terminal communication equipment may comprises: a plurality of radio communication terminals operating at a first frequency as a transmission frequency and a second frequency, which is different from the first frequency, as a reception frequency; and a repeater for receiving a radio wave transmitted at the first frequency from any one of the radio communication terminals, and transmitting data contained in the first frequency as it is or after processing it, at the second frequency.

Any one of the radio communication terminals may transmit data only when a data transmission request is provided and the other terminals are not transmitting data. The repeater may receive data, process the data or leave the data as it is, and exchange the data with another communication system or terminal equipment through a wired network or a radio network. Any one of the radio communication terminals may compare transmitted data with data returned from the repeater during data transmission, and evaluate communication conditions between the own radio communication terminal and the repeater.

Each of the radio communication terminals may have a different random number table, determine a delay time according to values in the random number table if an interference with another terminal is detected, and again transmits data after the delay time. Each of the radio communication terminals may receive checking data transmitted from itself or another terminal or the repeater while no data communication is being carried out between the terminals, and according to the checking data, evaluate data transmission conditions between the own terminal and the repeater. The repeater may evaluate data from any one of the radio communication terminals, and if the data disagrees with a prescribed format, ignores and does not relay the data.

Further, according to the present invention, there is also provided a radio control module for carrying out radio communication between at least two terminals, having an interface unit to be attached to a terminal for data communication, a transmission unit for radioing data, and a reception unit for receiving radioed data, comprising: a transmission request signal detecting unit, a transmission disabling code generating unit, and a transmission enabling code generating unit, disposed in a transmitter portion; and a transmission disabling code detecting unit, a transmission enabling code detecting unit, a transmission disabled state storing unit, and a transmission disabling unit, disposed in a receiver portion, the radio control module transmitting, before transmitting data, a transmission disabling code for disabling data transmission of the other modules, and after completely transmitting the data, a transmission enabling code for canceling the disabled states of the other modules.

The radio control module may further comprise a data detecting unit and a timer unit both disposed in the transmitter portion, for enabling transmission when a data transmission interval of the transmitter portion exceeds a predetermined period. The radio control module may further comprise a data detecting unit and a timer unit both disposed in the receiver portion, for enabling transmission when a data reception interval of the receiver portion exceeds a predetermined period.

The radio control module may be used as a radio communication terminal. The transmission unit and reception unit may operate at the same frequency. The transmission unit and reception unit may operate at different frequencies, respectively.

The radio control module may be used as a repeater. The radio control module may receive a radio wave transmitted at the first frequency from a radio communication terminal, process data contained in the first frequency or leave the data as it is, and transmit the data at the second frequency.

BRIEF DESCRIPTION OF THE DRAWINGS

The present invention will be more clearly understood from the description of the preferred embodiments as set forth below with reference to the accompanying drawings, wherein:

FIGS. 5, 5A and 5B are flowcharts showing an example of communication control carried out in a radio communication terminal of a multiple-terminal communication system according to a second embodiment of the invention;

FIG. 11, 11A-1, 11A-2 and 11B are flowcharts showing an example of communication control carried out in a radio communication terminal in a multiple-terminal communication system according to a fourth embodiment of the invention;

FIG. 14 is a diagram explaining an operation sequence of the radio control module of FIG. 13;

FIGS. 15, 15A–15D are circuit diagrams showing an example of the radio control module of FIG. 13;

FIG. 16 is a block diagram showing another example of a radio control module for a multiple-terminal communication system according to the invention;

FIG. 17 is a diagram explaining an operation sequence of the radio control module of FIG. 16;

FIG. 22 is a block diagram showing an example of a radio control module employed in a conventional multiple-terminal communication system.

DESCRIPTION OF THE PREFERRED EMBODIMENTS

For a better understanding of the preferred embodiments of the present invention, an interface provided for a standard personal computer and a radio control module employed in a conventional multiple-terminal communication system will be explained with reference to FIGS. 20A to 22.

Data communication between terminal equipment such as personal computers is carried out through a wired network such as a LAN (Local Area Network), or a radio network. In any case, each terminal equipment must have transmission and reception frequencies, so that the number of frequency channels required for terminal communications will be at least twice the number of the terminal equipment units.

To form a teleconference system with terminal equipment such as personal computers, RS-232C interfaces are usually employed. A multiple-terminal communication system according to the present invention employs a module to be attached to an RS-232C interface of, for example, a personal computer, as will be explained in greater detail later.

The RS-232C interface will be briefly explained.

Figure 20A:
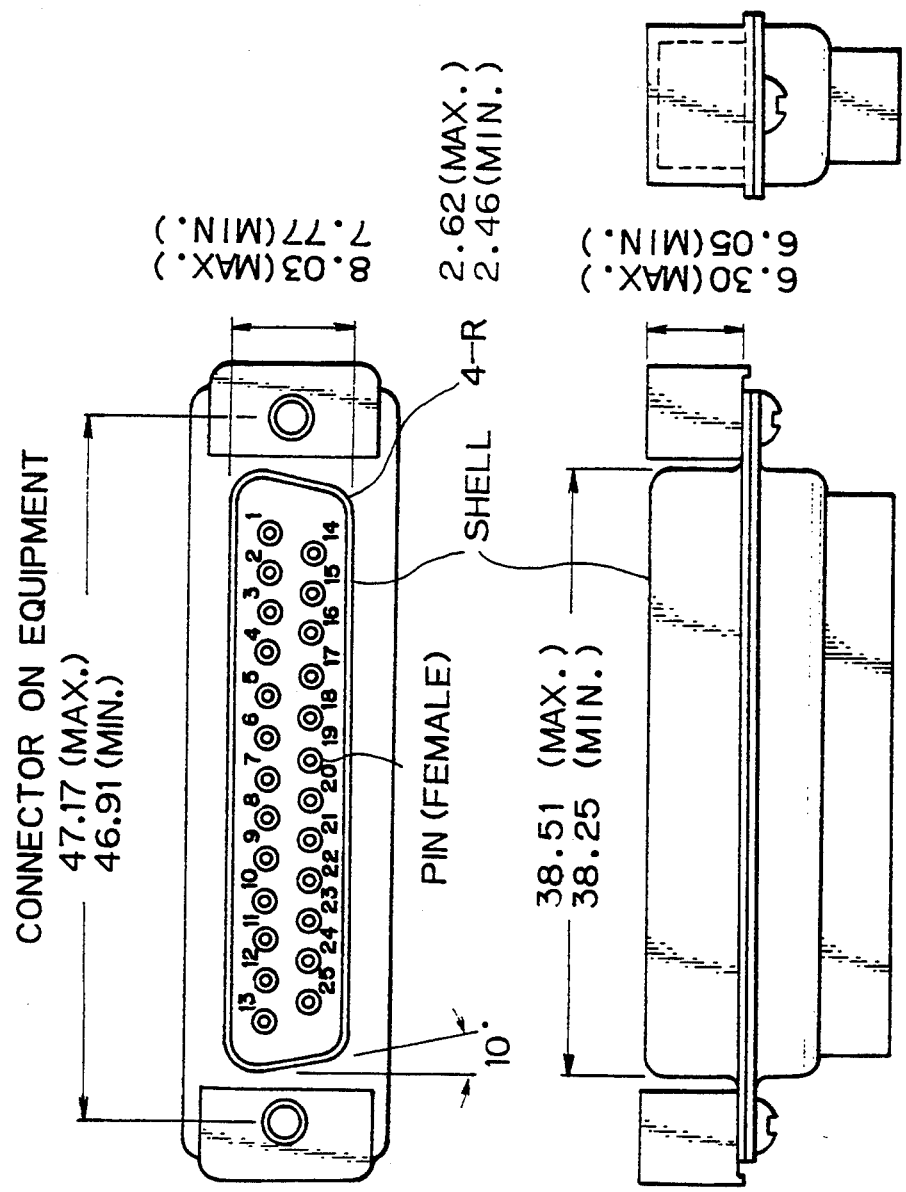
FIGS. 20A and 20B are diagrams showing an example of an interface provided for a standard personal computer.
Figure 20B:
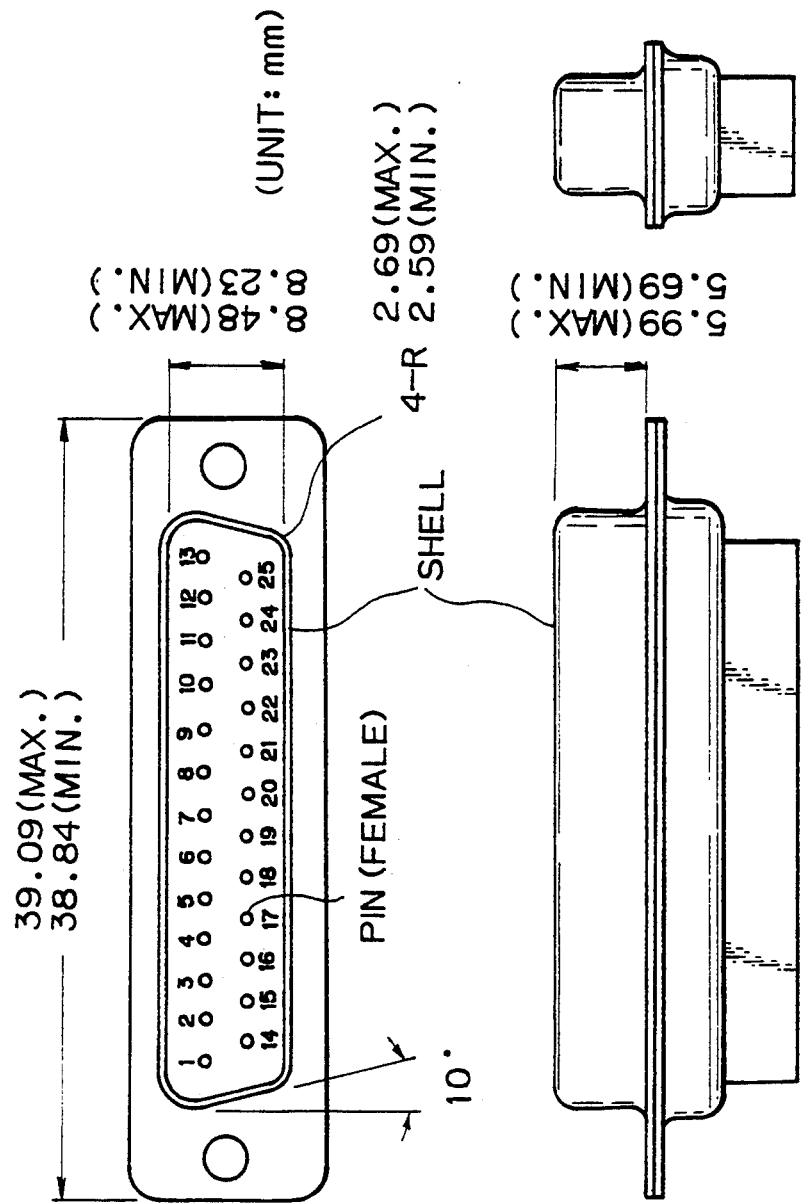
Figure 21:
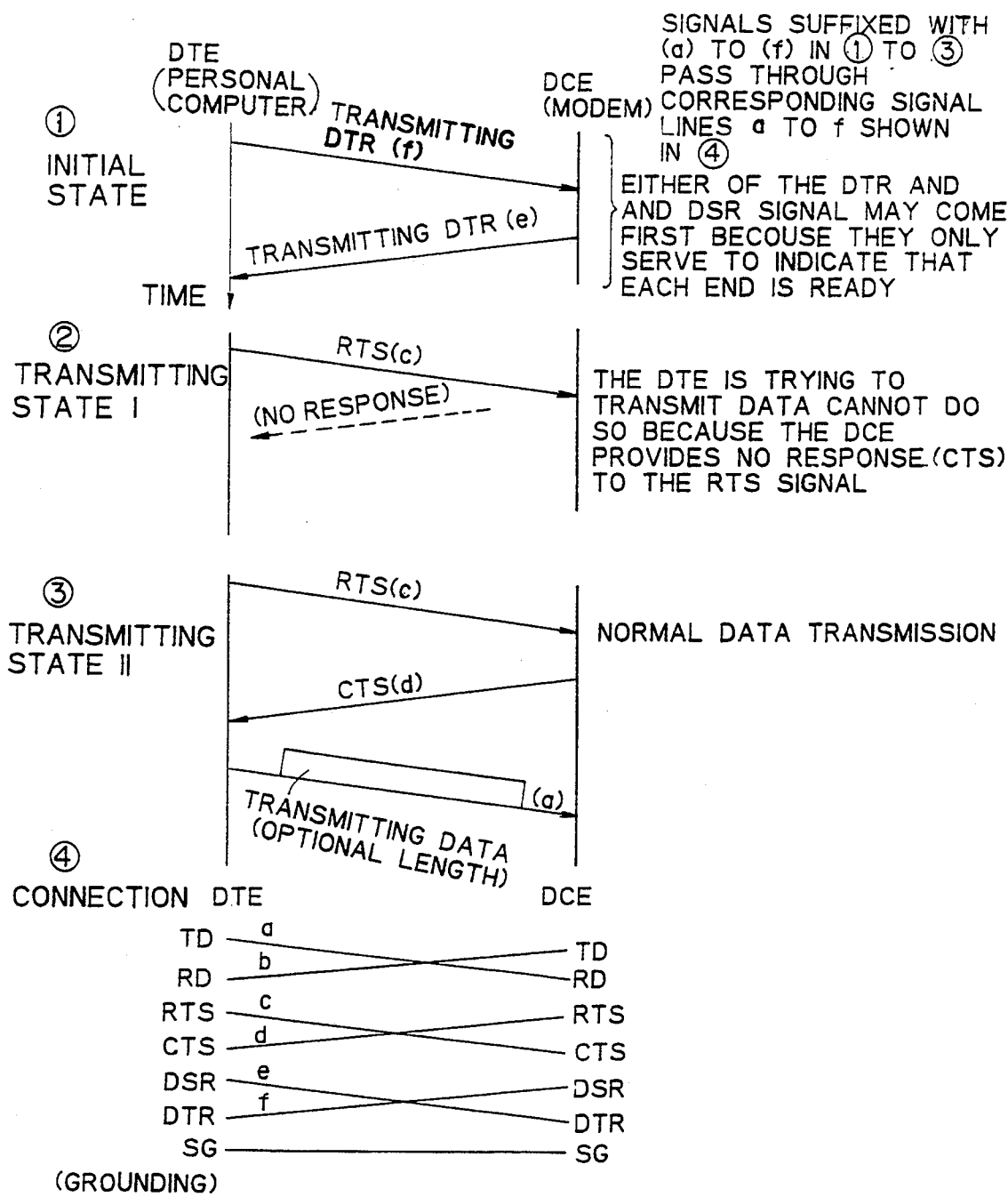
FIG. 21 is a diagram explaining an operation of the interface of FIGS. 20A and 20B.

FIGS. 20A and 20B show an example of the RS-232C interface provided for a standard personal computer, and FIG. 21 explains the operation of the interface.

RS-232C standards stipulate data communication between communication equipment, and prescribes the mechanical shapes of connectors, the magnitudes of electric signals passing through the connectors, the meanings of the electric signals, and methods of communicating the signals.

Generally, the RS-232C interface is used for transmitting data between a data terminal equipment (DTE) such as a personal computer and a data circuit terminating equipment (DCE) such as a modem. The RS-232C interface handles signal lines as listed in Table 1, which shows only typical signal lines and omits other signal lines that are not directly related to communication operations. These signal lines are activated or inactivated (set to 1 or 0, or a low voltage level or a high voltage level) to transmit information such as data and control data from a transmitting end to a receiving end.

TABLE 1

| | Pin No. | Name | In/Out | Function |
|---|---|---|---|---|
| Data | 2 | TD | Out | Transmitting data to an opposite end. |
| | 3 | RD | In | Receiving data from the opposite end |
| Control | 4 | RTS | Out | There is data to send. (Asking the opposite end to receive the data.) |
| | 5 | CTS | In | Are you ready? (Fetching the status of the opposite end.) |
| Status | 6 | DSR | In | Are you sound? (Fetching the status of the opposite end.) |
| | 20 | DTR | Out | This end is sound. (Informing the opposite end of the status of this end.) |
| Common | 7 | SG | — | Common ground (Return of every signal line) |

DSR (Data Set Ready) and DTR (Data Terminal Ready) signal lines are activated to indicate that a signal transmitting end is ready. (These signals usually indicate a power source ON state.) An RTS (Request To Send) signal line is activated to notify a receiving end that the transmitting end has data to transmit. A CTS (Clear To Send) signal line is used for receiving a reply from the receiving end for the transmitted RTS signal. TD (Transmitted Data or Tx Data) and RD (Received Data or Rx Data) signals are data signals involving predetermined time changes.

It must be noted that, as shown in (4) of FIG. 21, the signal lines of the DTE and DCE are crossed because transmission of one end is the reception of the other end. This must be particularly noted when understanding the operations of the signals. Usually, explanations on the signals are made based on the DTE. For example, a CTS signal means an RTS signal transmitted from the DCE and received by a CTS terminal of the DTE.

Referring to FIG. 21, an example of operation of transmitting data from the DTE to the DCE will be explained.

(1) The DTE activates the DTR signal line, and the DCE activates the DSR signal line, to indicate that the DTE and DCE are both ready.

(2) The DTE activates the RTS signal line to notice the DCE that the DTE has data to transmit, as indicated with (c) in (2) and (3) of FIG. 21.

(3) In response to the activation of the RTS signal line, the DCE activates the CTS signal line if the DCE is ready to receive the data, as indicated with (d) in (3) of FIG. 21. If the DCE is not ready to receive the data, the DCE keeps the CTS signal line inactive, as indicated with a dotted line in (2) of FIG. 21.

(3)' In response to the activated CTS signal line, the DTE starts transmitting the data through the TD line as indicated with (a) in (3) of FIG. 21. If there is no reply from the DCE, the DTE does not transmit the data.

Data transmission from the DCE to the DTE is similarly carried out. In this case, however, the names of signal lines used are based on the DCE that controls the transmission. With the control processes mentioned above, data is transmitted through the RS-232C interface.

A module (a radio control module) may be attached to an RS-232C interface of a communication terminal equipment such as a personal computer, to provide the terminal equipment with a radio communication function. The communication terminal equipment having the radio communication function is categorized as a very-weak-power radio station prescribed by the Japanese Radio Law.

Unlike a standard radio station, the very-weak-power radio station is a convenient radio communication unit that can be used by anyone without a license. The very-weak-power radio stations, therefore, are widely used as cordless telephone sets, wireless microphones, simple data transmission unit, etc. In particular, the radio control modules having the RS-232C interfaces are frequently used for transmitting data between personal computers, in which a pair of personal computers and the radio control module forms a radio communication terminal.

Generally, a pair of such radio communication terminals carries out full-duplex communication by using two different frequencies because the RS-232C interface is constituted for one-to-one communication. In an exceptional case, however, a specific terminal may be used exclusively as a transmission terminal, and another or more terminals as reception-only terminals, to carry out one-way communication without interface control. This may be the case of a broadcasting station that transmits information to many domestic receivers. In this case, each receiver cannot transmit data because it will be uncontrollable if a plurality of receivers simultaneously transmit data.

FIG. 22 is a block diagram showing an example of a radio control module used for a conventional multiple-terminal communication system. In the figure, reference numeral 501 denotes a personal computer, 502 a radio control module (hereinafter referred to as the module), 521 a transmitter, 522 an RS-232C controller (hereinafter referred to as the controller), and 523 a receiver.

An RS-232C interface is used for transmitting both data and control signals between the personal computer 501 and the module 502. The names of signal lines are defined based on the personal computer, if not particularly mentioned, and an expression such as "sending a signal" means an activation of a corresponding signal line.

After preparing data to transmit, the personal computer 501 transmits an RTS signal to ask the module 502 whether or not it is ready to receive the data. If the data is receivable, the module 502 returns a CTS signal and waits for the data. If the data is not receivable, the module 502 keeps a no-reply state. After confirming the CTS signal from the module 502, the personal computer 501 transmits the data. Transmission control of the module 502 is carried out by the controller 522. The data received by the module 502 is sent to the transmitter 521 and transmitted outside as a radio signal at a frequency of F.

For reception, the receiver 523 receives a radio signal at a frequency of f and transfers the received data to the controller 522. The controller 522 then sends an RTS signal to the personal computer 501. After receiving a replying CTS signal from the personal computer 501, the controller 522 sends the received data to the personal computer 501. (In this case, the names of the signals are based on the module 502).

As mentioned before, the conventional wired technique such as the LAN for communicating data between terminal equipment requires enormous costs for laying circuits and cables for connecting the equipment. This is the reason why the wired technique is not widely used.

On the other hand, the conventional wireless technique for communicating data between terminal equipment requires, for example, radio frequency channels of more than twice the number of the terminal equipment. In addition, the number of the terminal equipment is not easily expanded because frequencies handled by a repeater are limited. Since usable radio frequencies are limited, it is not economical to employ many frequencies for communications within one group.

Next, preferred embodiments of the present invention will be explained with reference to the drawings.

Figure 1:
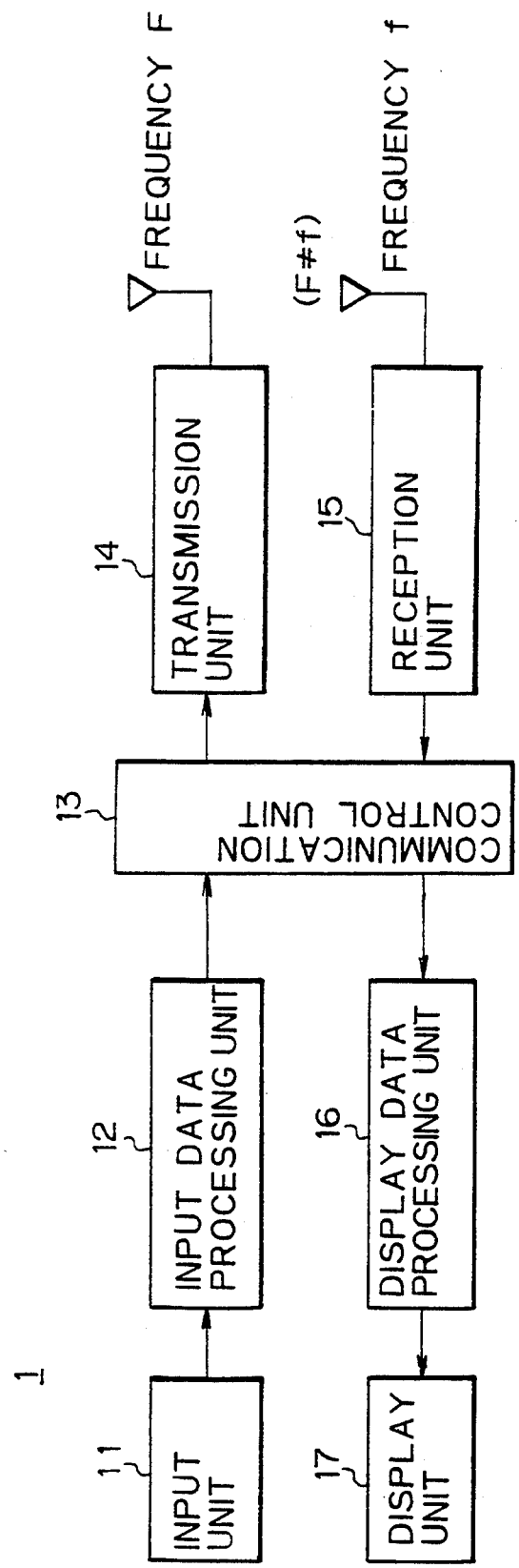
FIG. 1 is a block diagram showing an example of a radio communication terminal in a multiple-terminal communication system according to the invention.

FIG. 1 is a block diagram showing an example of a radio communication terminal in a multiple-terminal communication system according to the invention. In the figure, the radio communication terminal 1 is formed as a terminal having a CPU such as a personal computer. The radio communication terminal 1 comprises an input mechanism 11 such as a keyboard, an input data processing mechanism 12, a communication control mechanism 13, a transmission mechanism 14, a reception mechanism 15, a display data processing mechanism 16, and a display mechanism 17 such as a display unit. The radio communication terminal 1 involves, for example, a so-called notebook-type personal computer. Namely, the radio communication terminal 1 is formed by attaching a communication control module to the notebook-type personal computer.

Data entered through the input mechanism 11 is converted by the input data processing mechanism 12 into a data sequence that is processible by the computer. The data is then transferred to the communication control mechanism 13 and to the display data processing mechanism 16. The communication control mechanism 13 processes the data and transfers the same to the transmission mechanism 14, which transmits the data outside at a frequency of F.

On the other hand, data received by the reception mechanism 15 at a frequency of f is processed by the communication control mechanism 13 and transferred to the display data processing mechanism 16, which converts the data into displayable data. This data is then displayed on the display mechanism 17.

Figure 2:
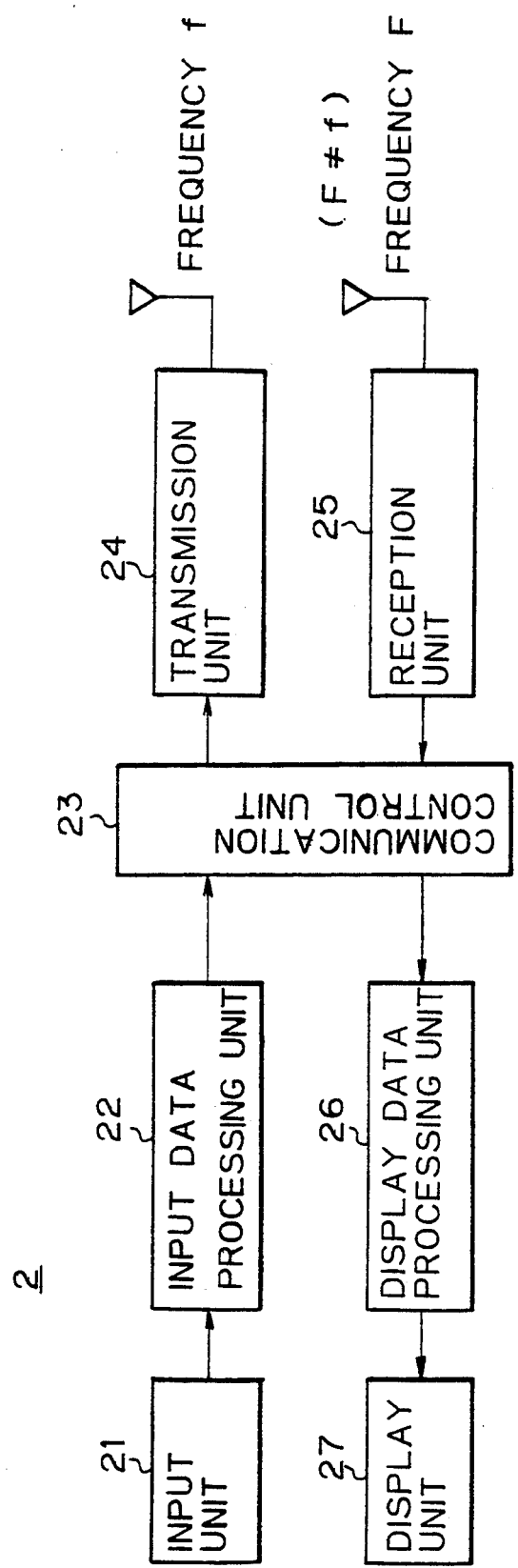
FIG. 2 is a block diagram showing a repeater in the multiple-terminal communication system according to the invention.

FIG. 2 is a block diagram showing a repeater in the multiple-terminal communication system according to the invention. The repeater 2 comprises an input mechanism 21 such as a keyboard, an input data processing mechanism 22, a communication control mechanism 23, a transmission mechanism 24, a reception mechanism 25, a display data processing mechanism 26, and a display mechanism 27 such as a display unit.

The reception mechanism 25 of the repeater 2 receives a radio wave at a frequency of F transmitted from the radio communication terminal 1, and the communication control mechanism 23 processes the received data, if required. The data is then transferred to the transmission mechanism 24, which transmits the data outside at a frequency of f. The input mechanism 21 and input data processing mechanism 22 are used for controlling the repeater 2. The display mechanism 27 and display data processing mechanism 26 are used for monitoring instructions entered through the input mechanism 21 as well as transmission and reception data.

Figure 3A:
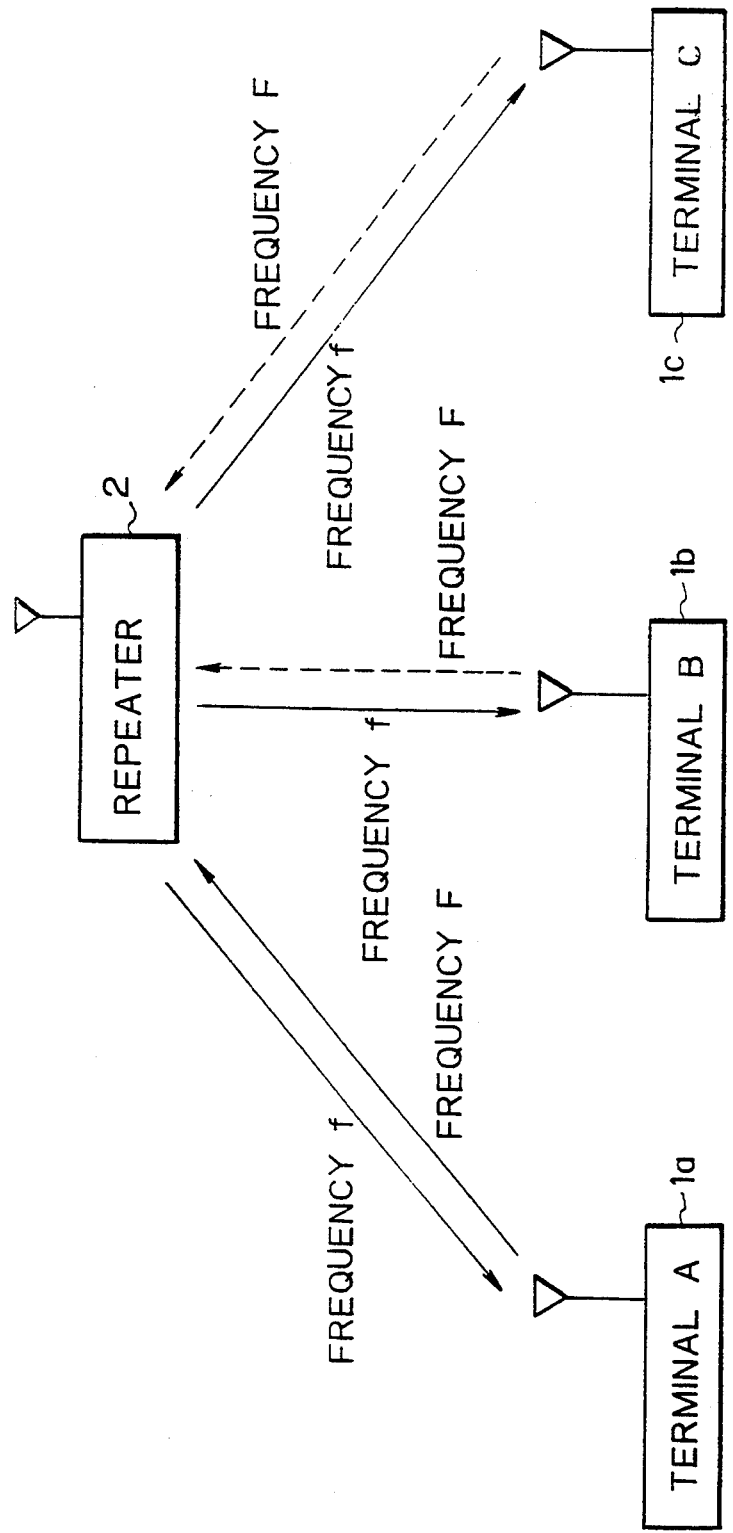
FIGS. 3A and 3B are diagrams showing relationships between radio communication terminals and a repeater in a multiple-terminal communication system according to a first embodiment of the invention.
Figure 3B:
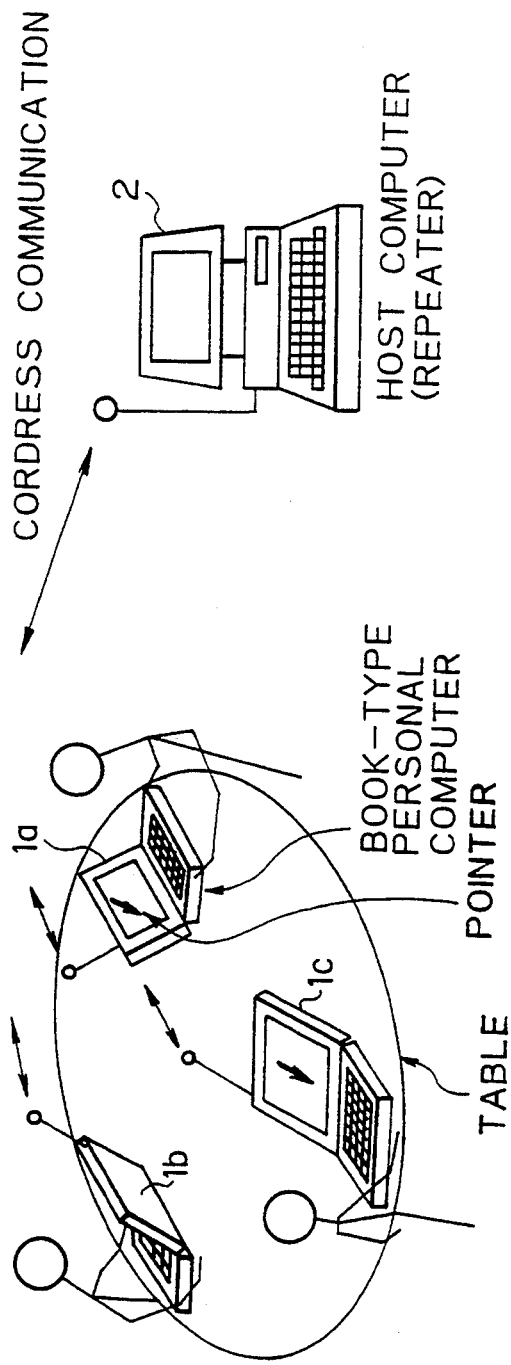

FIGS. 3A and 3B are diagrams showing correlations between radio communication terminals and a repeater in a multiple-terminal communication system according to a first embodiment of the invention, in which FIG. 3A is a block diagram, and FIG. 3B a diagram showing a teleconference now being held. In these figures, the repeater 2 receives a radio wave at a frequency of F from one (for example, 1a) of the radio communication terminals 1a, 1b, 1c, . . . , converts the frequency F into f that is different from F, and transmits a radio wave at the frequency f to the radio communication terminals 1a, 1b, 1c, . . . The radio communication terminals 1a, 1b, 1c, . . . are controlled by respective communication control mechanisms 13 such that only one of the radio communication terminals is allowed to transmit data at a time. To explain this situation, transmission from the radio communication terminal 1a is indicated with a continuous line in FIG. 3A while transmission from the other radio communication terminals with dotted lines in the same drawing.

Figure 4:
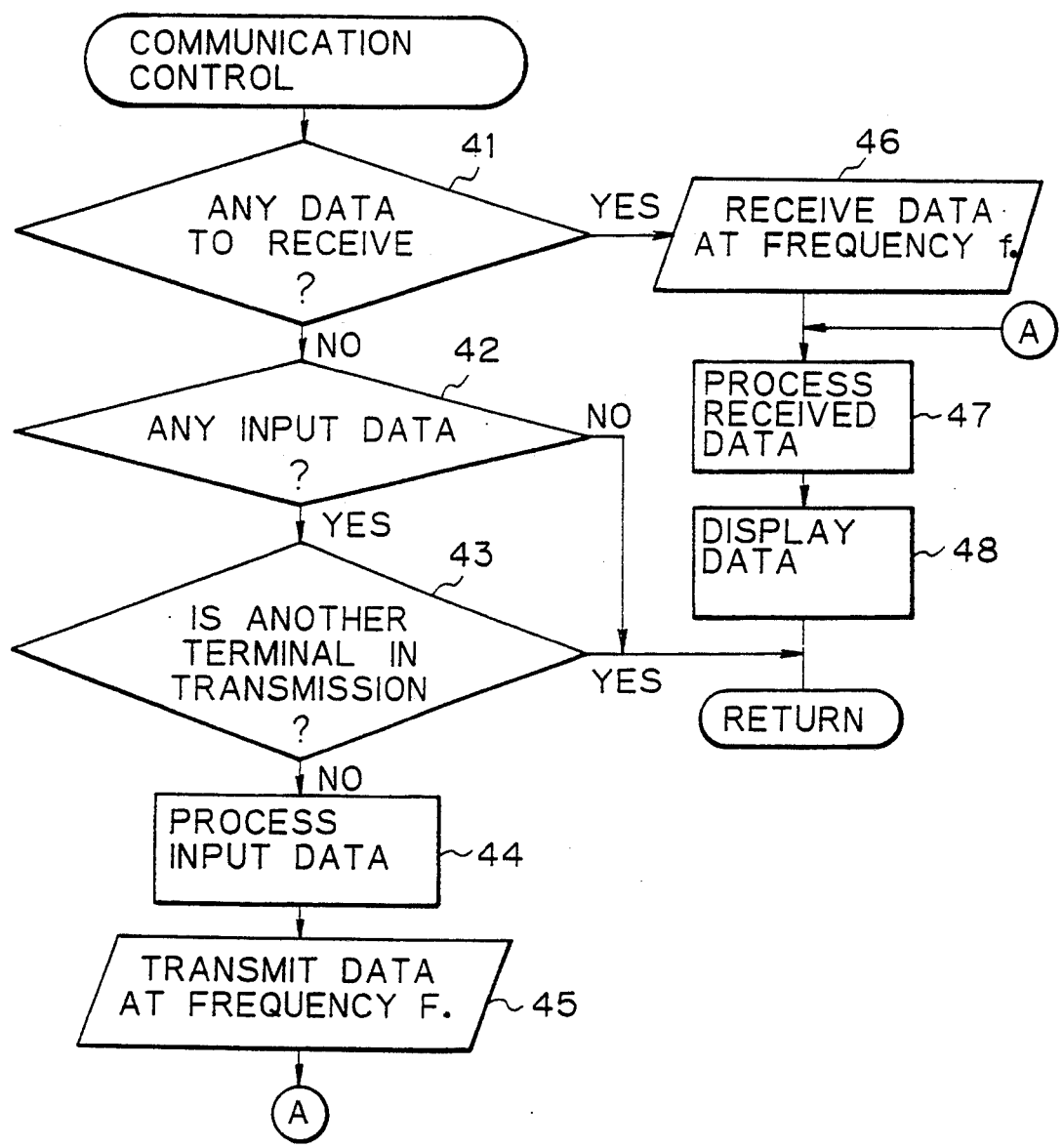
FIG. 4 is a flowchart showing an example of communication control carried out in the radio communication terminal of the multiple-terminal communication system according to the first embodiment of the invention.

FIG. 4 is a flowchart showing an example of communication control carried out in the radio communication terminal of the multiple-terminal communication system according to the first embodiment of the invention. When the communication control is started, Step 41 checks a data receiving state. If there is data to receive, Step 46 receives the data at a frequency of f, and Step 47 processes the received data. Step 48 displays the processed data on the display unit. After the completion of the display process of Step 48, the flow returns to Step 41 to repeat these processes.

If there is no data to receive in Step 41, Step 42 checks to see whether or not there is input data. If there is no input data in Step 42, the flow returns to the start, and if there is the input data, Step 43 checks to see whether or not another radio communication terminal is transmitting data. If Step 43 determines that no terminal is transmitting data, Step 44 processes the input data, and Step 45 transmits the processed input data at a frequency of F. Step 47 processes received data (the input data), and Step 48 displays the received data, i.e., the data transmitted by its own terminal, on the display unit. If Step 43 determines that another terminal is transmitting data, the input data is not transmitted, and the flow returns to the start. By employing radio communication terminals each carrying out such communication control processes, changes in the number of terminal equipment units can be flexibly dealt with.

FIG. 5 is a flowchart showing an example of communication control carried out in a radio communication terminal of a multiple-terminal communication system according to a second embodiment of the invention. Note, FIGS. 5A and 5B show an upper and lower parts of the flowchart, respectively. When the communication control is started, Step 51 checks a data receiving state. If there is data to receive, Step 58 receives the data at a frequency of f. The received data is processed in Step 59 and analyzed in Step 60. If the received data is determined to be a transmission disabling code, Step 61 puts the terminal of its own in a transmission disabled state. If Step 60 determines that the received data is a transmission enabling code, Step 62 puts the terminal of its own in a transmission enabled state. If Step 60 determines that the received data is data other than the transmission disabling and enabling codes, Step 63 displays the received data.

If there is no data to receive in Step 51, Step 52 checks to see whether or not the terminal of its own is in a transmission disabled state. If Step 52 determines that it is in the transmission disabled state, the flow returns to the start. Otherwise, Step 53 checks to see whether or not there is input data. If Step 53 determines that there is no input data, Step 64 checks to see whether or not its own terminal has put the other terminals in a transmission disabled state. If Step 64 determines that its own terminal has disabled data transmission of the other terminals, Step 65 measures a time from previous data transmission. If Step 66 determines that a transmission enabling set time $\delta T$ has elapsed, Step 67 transmits a transmission enabling code at a frequency of F, and the flow returns to the start. If Step 66 determines that the transmission enabling set time $\delta T$ has not elapsed yet, the flow returns to the start. If Step 64 determines that the other terminals have not been put in the transmission disabled state, the flow returns to the start.

If Step 53 determines that there is input data, Step 54 checks to see whether or not the other terminals are in the transmission disabled state. If Step 54 determines that the other terminals are in the transmission disabled state, Step 56 is executed. If the other terminals are not in the transmission disabled state, Step 55 transmits a transmission disabling code at the frequency F, and Step 56 is carried out. Step 56 processes the input data, and Step 57 transmits the input data at the frequency F. Step 59 processes data (the input and received data), and the received data is displayed on the display unit through Steps 60 and 63. Here, a return step (B) means that the flow returns to Step 51 again to repeat the above processes.

Figure 6:
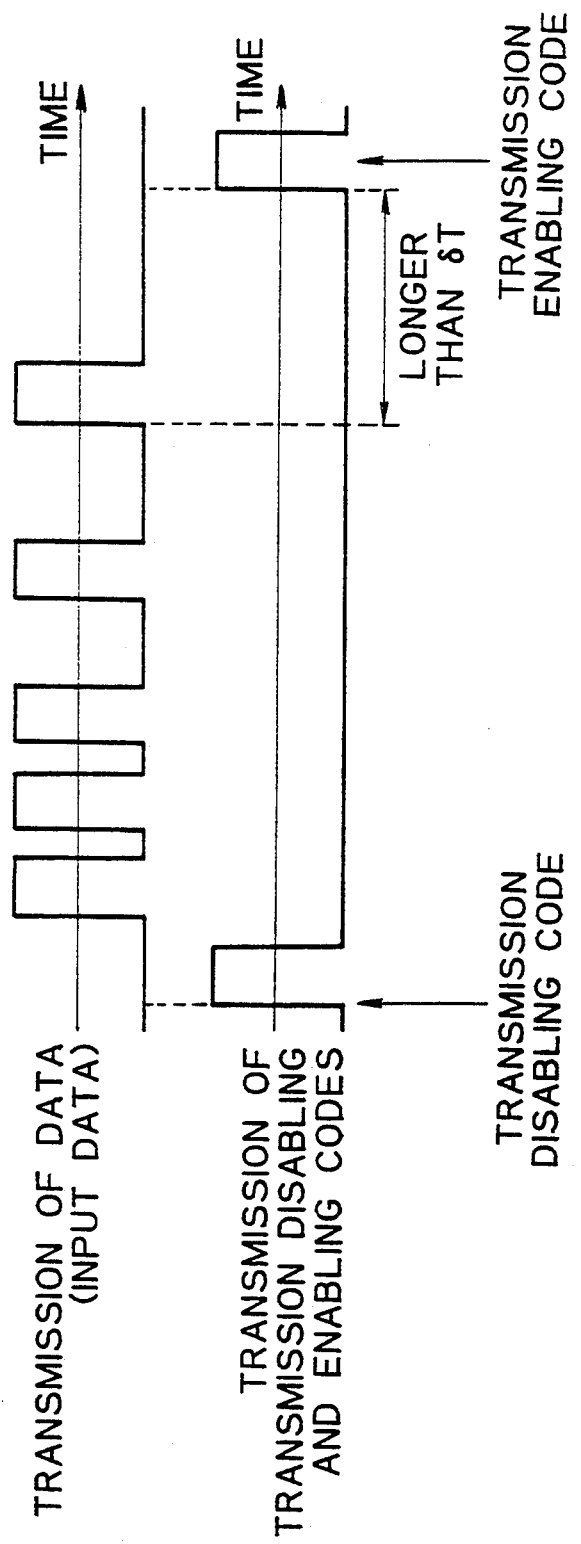
FIG. 6 is a diagram showing the timing of transmitting transmission disabling and enabling codes in the multiple-terminal communication system according to the second embodiment of the invention.

FIG. 6 is a diagram showing the timing of transmitting the transmission disabling and enabling codes in the multiple-terminal communication system according to the second embodiment of the invention, whose operations have been explained with reference to the flowchart of FIG. 5. The following explanation is based on an assumption that a transmitting end is in a transmission enabled state.

The transmission disabling code is transmitted before transmitting a series of data, and the transmission enabling code is transmitted if no transmission data is produced during the transmission enabling set time $\delta T$. Namely, the transmission enabling code is provided when no input data is entered through the keyboard, etc., for at least the time $\delta T$.

With use of the transmission disabling and enabling codes, the terminal equipment can transmit, with no interference with the other terminals, a series of data that are semantically continuous but intermittently produced at intervals shorter than $\delta T$.

Figure 7:
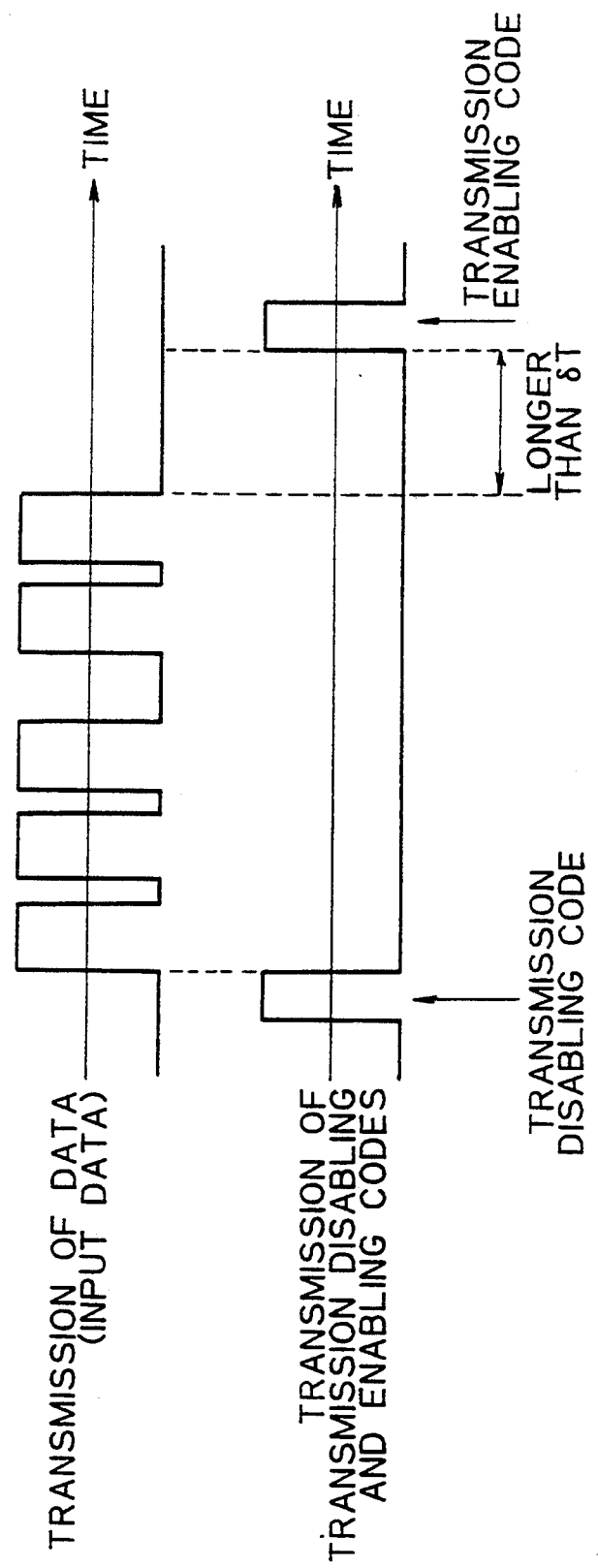
FIG. 7 is a diagram showing the modified timing of transmitting the transmission disabling and enabling codes shown in FIG. 6.

FIG. 7 is a diagram showing the modified timing of transmitting the transmission disabling and enabling codes of FIG. 6. What is different from FIG. 6 is that the transmission disabling code is sent just before transmitting a series of data. Namely, a series of data is transmitted just after a fall of the transmission disabling code.

Arrangements of the radio communication terminals and the repeater according to the second embodiment are the same as those shown in FIGS. 1 and 2, and their relationships are the same as those shown in FIGS. 3A and 3B.

Figure 8:
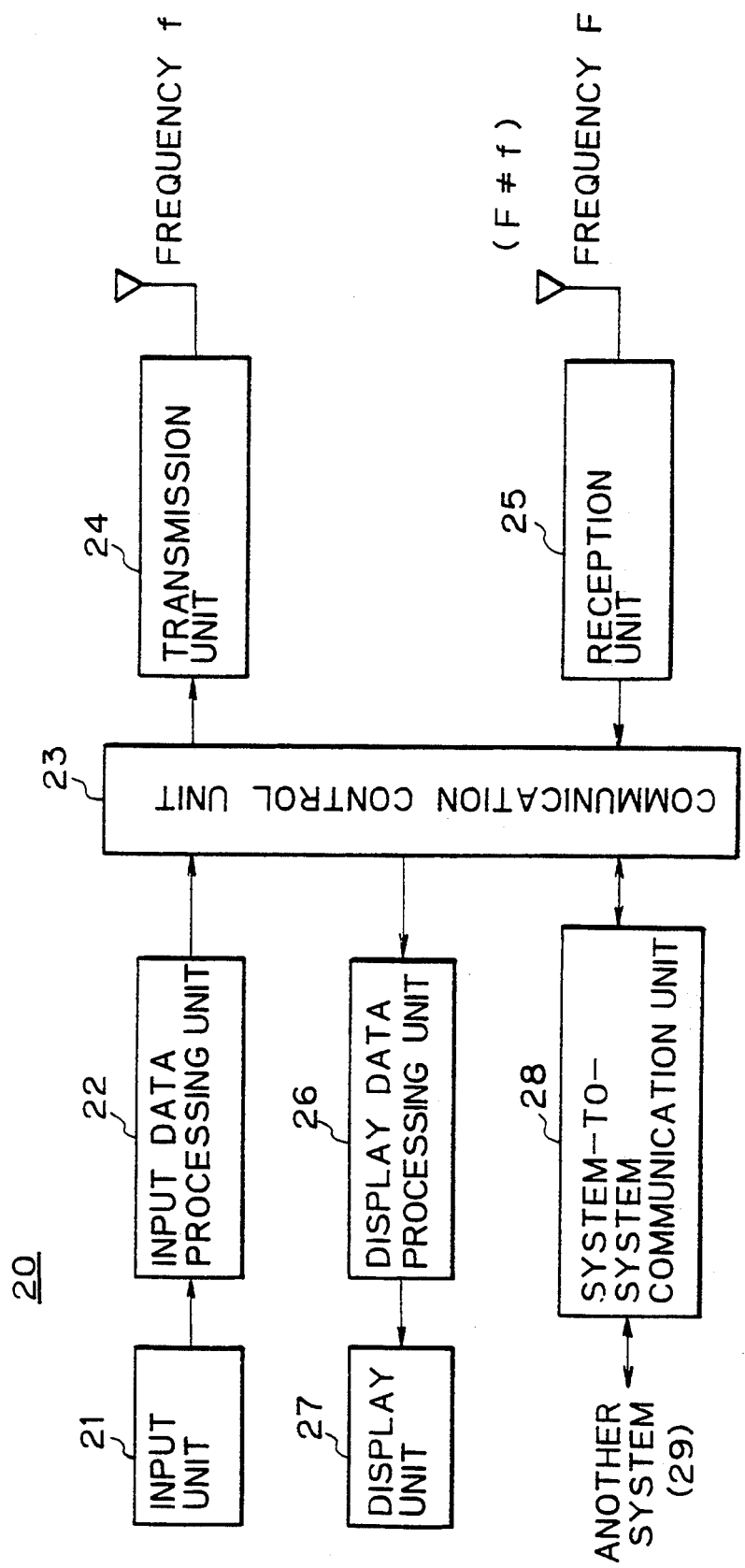
FIG. 8 is a block diagram showing a repeater in a multiple-terminal communication system according to a third embodiment of the invention.

FIG. 8 is a block diagram showing a repeater in a multiple-terminal communication system according to a third embodiment of the invention. In the figure, the repeater 20 comprises, similar to the one shown in FIG. 2, an input mechanism 21 such as a keyboard, an input data processing mechanism 22, a communication control mechanism 23, a transmission mechanism 24, a reception mechanism 25, a display data processing mechanism 26, and a display mechanism 27 such as a display unit. In addition, the repeater 20 according to this embodiment comprises a system-to-system communication mechanism 28 for communicating data with another system 29.

The reception mechanism 25 of the repeater 20 receives a radio wave at a frequency of F transmitted from the radio communication terminal 1, and the transmission control mechanism 23 processes the received data, if required. The data is then transferred to the transmission mechanism 24, which transmits the data at a frequency of f. The input mechanism 21 and input data processing mechanism 22 are used for controlling the repeater 20. The display mechanism 27 and display data processing mechanism 26 are used for monitoring instructions entered through the input mechanism 21 as well as reception and transmission data.

Data received by the reception mechanism 25 and instructions entered through the input mechanism 21 are processed in the communication control mechanism 23 and transferred to the system-to-system communication mechanism 28, which converts the data and instructions into data formats that are recognizable by peripherals and another system 29, and transmits the converted data to the peripherals and another system 29. The system-to-system communication mechanism 28 receives data from the peripherals and another system 29, converts the data formats as required, and transfers the data to the display mechanism 27 and radio communication terminals 1.

Figure 9:
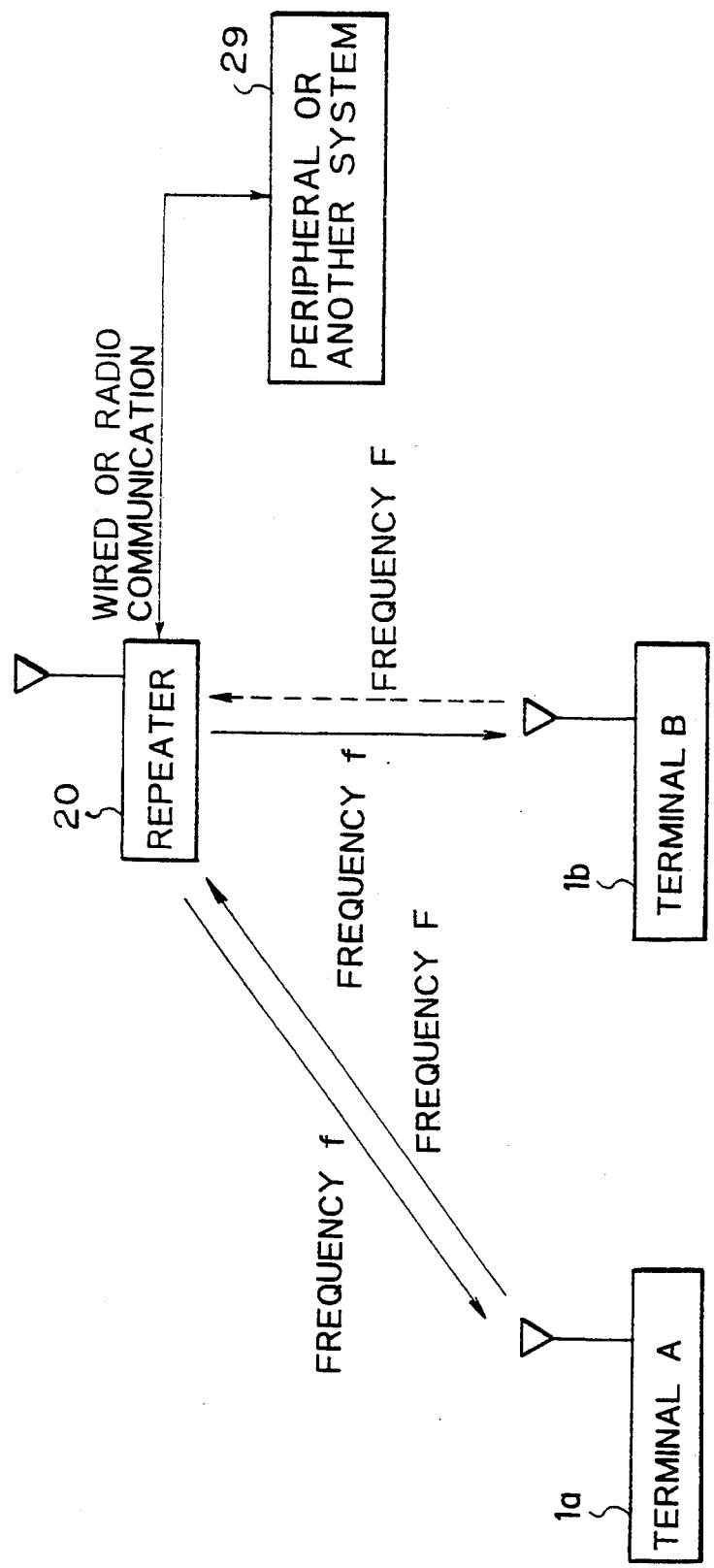
FIG. 9 is a diagram showing extendability of the multiple-terminal communication system according to the third embodiment of the invention.

FIG. 9 is a diagram explaining extendability of the multiple-terminal communication system according to the third embodiment of the invention. As shown in the figure, the repeater 20 is connected to the peripherals and another system 29 through a wired or radio network. Data to be transferred to the peripherals or another system 29 is not necessarily the same as that being communicated with the respective radio communication terminals 1a, 1b, . . . Each of the radio communication terminals according to the third embodiment is the same as that of FIG. 1.

As explained above, the invention can freely increase or decrease the number of communication terminals and improve usage of radio frequencies. It is possible to simultaneously use several groups of communication terminal equipment with different channels of radio waves.

Figure 10:
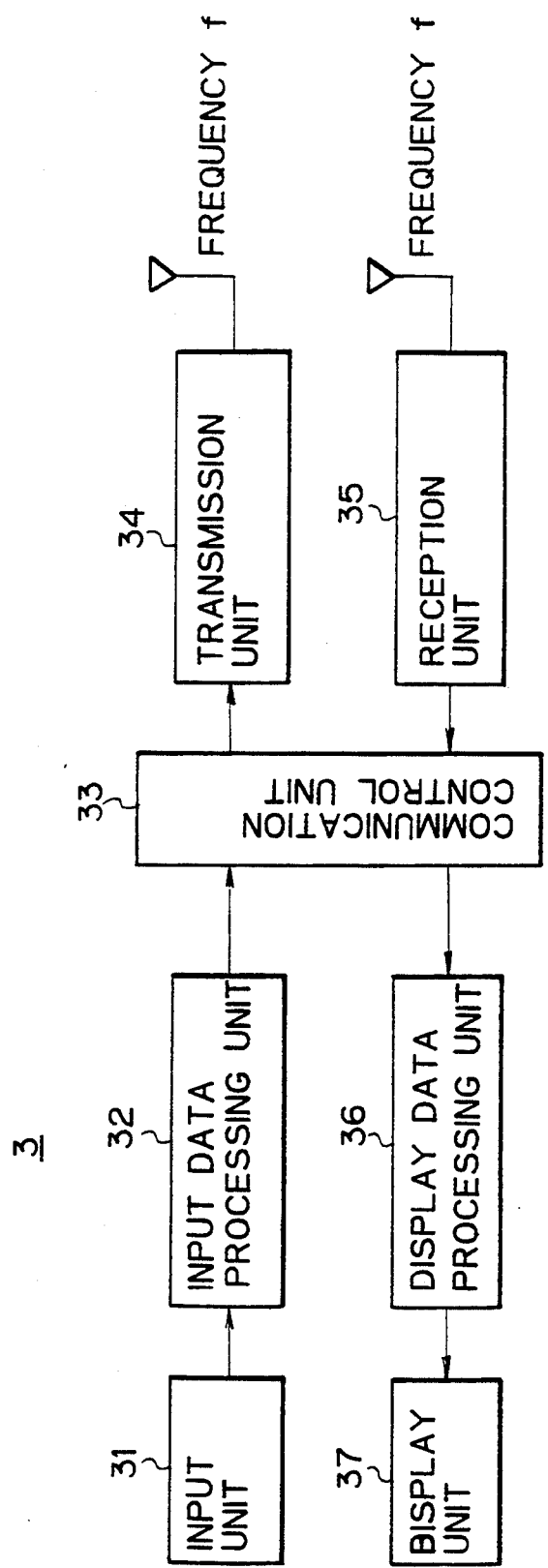
FIG. 10 is a block diagram showing another example of a radio communication terminal in a multiple-terminal communication system according to the invention.

FIG. 10 is a block diagram showing another example of a radio communication terminal in a multiple-terminal communication system according to the invention. This radio communication terminal transmits and receives data at the same frequency f. Namely, this example corresponds to the radio communication terminal of FIG. 1 operating at the same frequency for transmission and reception. The multiple-terminal communication system of FIG. 10 does not require the repeater of FIG. 2 and only employs the terminal equipment 3.

As may be apparent from comparison of FIGS. 1 and 10, an input mechanism 31, input data processing mechanism 32, a communication control mechanism 33, and transmission mechanism 34 of the radio communication terminal 3 of FIG. 10 correspond to the input mechanism 11, input data processing mechanism 12, communication control mechanism 13, and transmission mechanism 14 of the radio communication terminal 1 of FIG. 1, respectively. Also, a reception mechanism 35, display data processing mechanism 36, and display mechanism 37 of the radio communication terminal 3 of FIG. 10 correspond to the reception mechanism 15, display data processing mechanism 16, and display mechanism 17 of the radio communication terminal 1 of FIG. 1, respectively. The flowcharts of FIGS. 4 and 5, therefore, are applicable to FIG. 10, after replacing the transmission frequency in the flowcharts with the frequency f and the radio communication terminals and repeater with the radio communication terminals 3.

Namely, in the flowchart of FIG. 4, the frequency at which the processed input data is transmitted in Step 45 is equalized to the frequency f at which data is received in Step 46. As a result, the example of FIG. 10 can similarly carry out communication control process. In the flowchart of FIG. 5, the frequency at which the transmission disabling code is sent in Step 55, the frequency at which input data is sent in Step 57, and the frequency at which the transmission enabling code is sent in Step 67 are set to the frequency f at which data is received in Step 58. As a result, the same communication control process is carried out in the example of FIG. 10.

According to the radio communication terminal 3 of FIG. 10, data processed in the input data processing mechanism 32 is sent to the communication control mechanism 33, which processes the data and transfers it to the transmission mechanism 34. The transmission mechanism 34 transmits the data at the frequency f. The transmitted data is received by the reception mechanism 35 and always monitored.

Figure 11B:
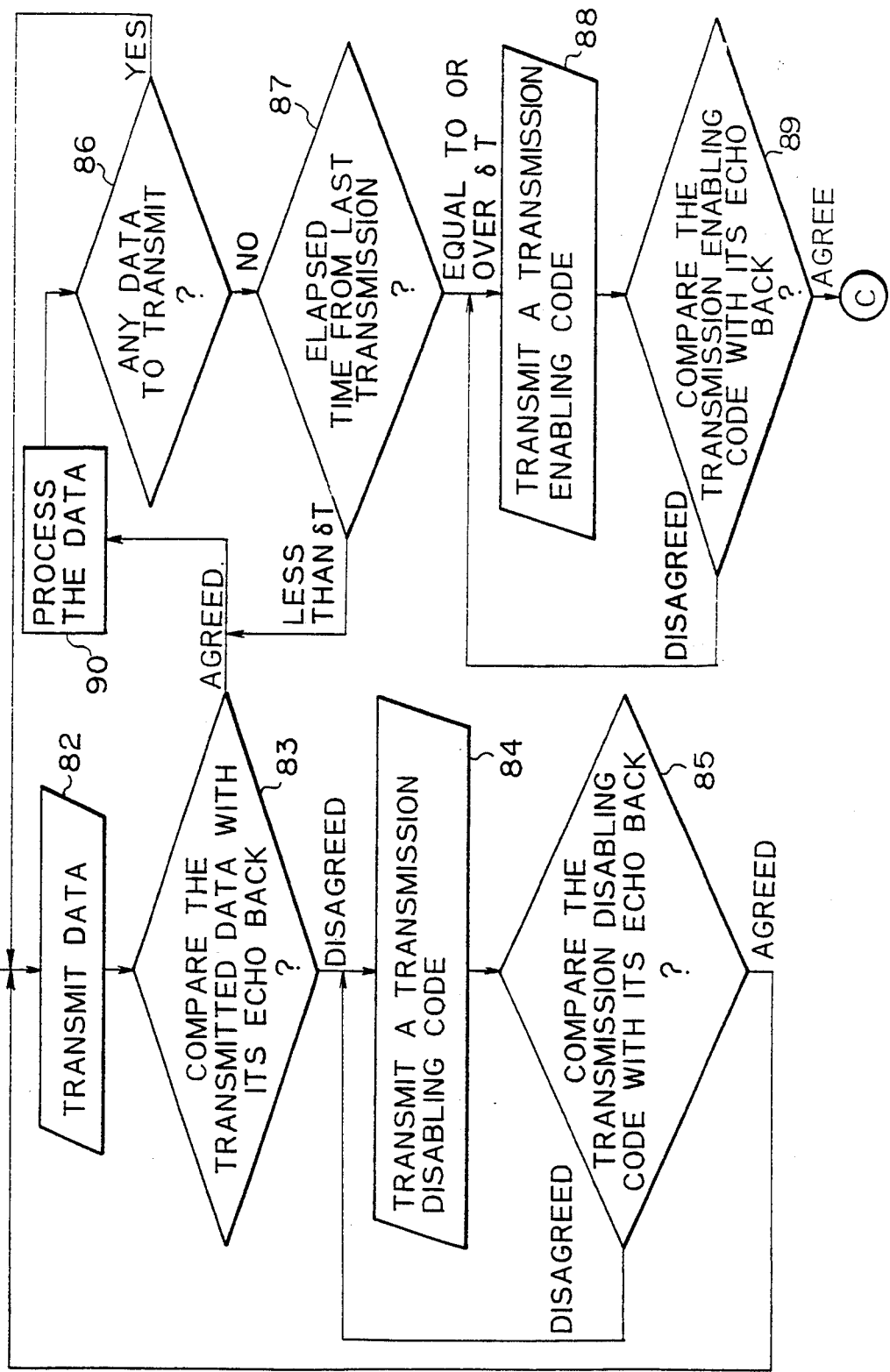

FIG. 11 is a flowchart showing an example of communication control carried out in a radio communication terminal for a multiple-terminal communication system according to a fourth embodiment of the invention. Note, FIGS. 11A and 11B show an upper and lower parts of the flowchart of FIG. 11, and further, FIGS. 11A-1 and 11A-2 show an upper and lower parts of the flowchart of FIG. 11A. Although the description of each step of these flowcharts slightly differs from the description of a corresponding step of the flowchart of FIG. 5, the flowchart of FIG. 11 is basically the same as that of FIG. 5 if adding echo back processing steps 75, 76, and 83 to 89 (processes of comparing transmitted data with received data) to the flowchart of FIG. 5. According to the multiple-terminal communication system of this embodiment, the transmission mechanism 34 of the radio communication terminal 3 of FIG. 10 transmits data at the frequency f, and the reception mechanism 35 always receives and monitors the transmitted data. The transmitted data is compared with the received data to detect an interference, and if required, the data is again transmitted. When the transmitted data is received by an opposite radio communication terminal, the communication control mechanism 33 of the opposite terminal processes the data, which is supplied to the display data processing mechanism 36 and converted into displayable data, which is displayed on the display mechanism 37 of the opposite terminal. The radio communication terminal 3 of FIG. 10 using the same frequency for transmission and reception does not require the repeater of FIG. 2.

In FIG. 11, Step 71 checks a data receiving state after the start of communication control. If there is data to receive, Step 78 receives the data, and identifies the data with use of the communication control mechanism (received data processing mechanism) 33. Here, Step 78 corresponds to a collection of Steps 58 to 60 of the flowchart of FIG. 5. If Step 78 determines that the received data is a transmission disabling code, Step 79 puts the terminal of its own in a transmission disabled state. If Step 78 determines that the received data is a transmission enabling code, Step 80 puts the terminal of its own in a transmission enabled state. If Step 78 determines that the received data is data other than the transmission disabling and enabling codes, Step 81 displays the received data.

If there is no data to receive in Step 71, Step 72 checks to see whether or not the terminal of its own is in a transmission disabled state. If Step 72 determines that the terminal is in the transmission disabled state, the flow returns to the start. If not so, Step 73 checks to see whether or not there is data to transmit. If Step 73 determines that there is no data to transmit, i.e., if there is no input data, the flow returns to the start. If there is data (input data) to transmit, Step 74 transmits a transmission disabling code. Thereafter, Step 75 compares an echo back of the transmitted transmission disabling code (the transmitted data is received and monitored by the terminal of its own) with the actually transmitted transmission disabling code. If the data differ from each other, it is determined that the transmitted data has interfered with data transmitted from another terminal. In this case, Step 76 pauses for a period determined according to a random number table that is peculiar to the terminal. Thereafter, Step 77 checks to see whether or not there is data to receive. If Step 77 determines that there is data to receive, the flow again goes to Step 78. If there is no data to receive, Step 74 again transmits the transmission disabling code.

If Step 75 determines that the echo back of the transmitted data is identical with the actually transmitted data, i.e., if the transmitted transmission disabling code is identical with its echo back, Step 82 starts transmitting data. Thereafter, step 83 determines whether or not the transmitted data is equal to its echo back. If they are not equal to each other, the data is repeatedly transmitted through Steps 84 and 85 until the transmitted data agrees with its echo back. Steps 84 and 85 correspond to Steps 74 and 75 explained before.

If Step 83 determines that the transmitted data and its echo back are identical with each other, Step 90 displays the transmitted data, Step 86 transmits the next data and returns to Step 82. If there is no data to transmit, Step 87 measures the time from last data transmission. After a predetermined time (a set time for releasing the transmission disabled state) 6T, Step 88 and 89 repeatedly transmit a transmission enabling code until it agrees with its echo back. Steps 88 and 89 correspond to Steps 84 and 85 (Steps 74 and 75).

In the above explanation, the timing of transmitting the transmission disabling or enabling code is the same as that shown in FIGS. 6 and 7.

According to the multiple-terminal communication system of the fourth embodiment of the invention shown in FIG. 11, each of the radio communication terminals 3 uses the same frequency f for data transmission and reception as shown in FIG. 10. It is possible, according to the fourth embodiment, to use the radio communication terminals 1 and repeater 2 using different frequencies for data transmission and reception as shown in FIGS. 1 and 2. In this case, the input mechanism 11 of the radio communication terminal 1 receives input data, and the input data processing mechanism 12 converts the data into a data sequence that is processible in the computer. Thereafter, the data is transferred to the communication control mechanism 13 and display data processing mechanism 16. Also, the data processed in the communication control mechanism 13 is transferred to the transmission mechanism 14, which transmits the data at the frequency F. The transmitted data is repeated at the frequency f by the repeater 2 shown in FIG. 2. The radio communication terminal 1 that has transmitted the data compares the actually transmitted data with the data (an echo back) transmitted at the frequency f from the repeater 2, to detect an interference, and if necessary, again transmits the data.

In this way, when using the radio communication terminals 1 and repeater 2 using different frequencies for transmission and reception as shown in FIGS. 1 and 2, the echo back data shown in the flowchart of FIG. 11 corresponds to the data transmitted at the frequency f from the repeater 2. The data transmitted at the frequency F from the radio communication terminal 1 to the repeater 2 is not processed in the repeater 2 but transmitted as it is at the frequency f therefrom.

Figure 12:
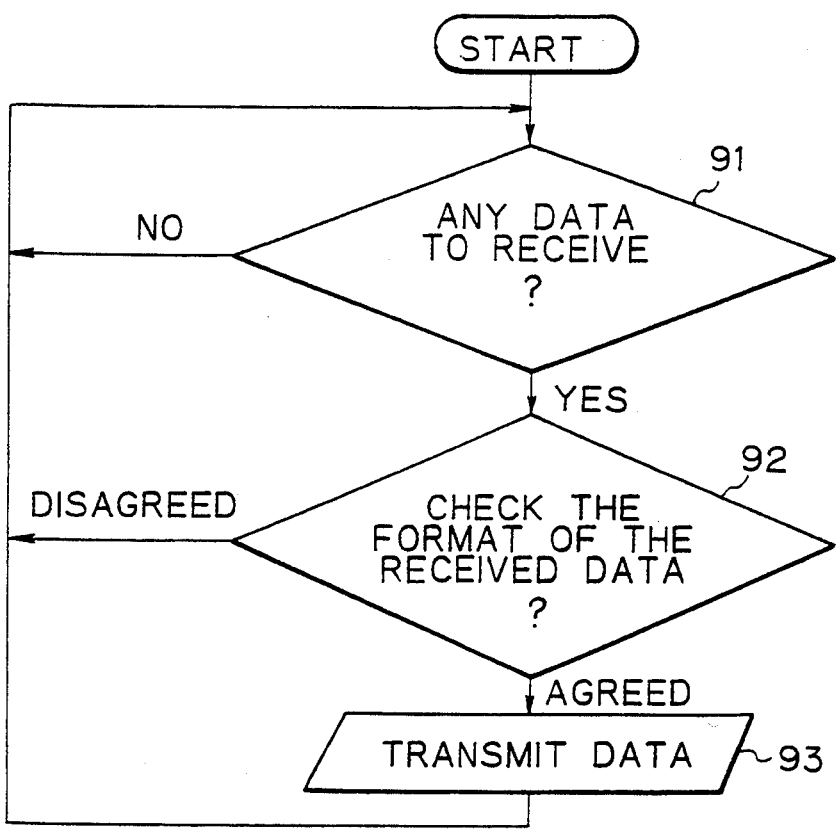
FIG. 12 is a flowchart showing an example of communication control carried out in a radio communication terminal in a multiple-terminal communication system according to a fifth embodiment of the invention.

FIG. 12 is a flowchart showing an example of communication control carried out in a repeater for a multiple-terminal communication system according to a fifth embodiment of the invention.

In Step 91 of FIG. 12, a reception mechanism 25 of the repeater 2 checks to see whether or not there is data to receive transmitted from a radio communication terminal 1 at a frequency of F. If there is no data to receive, the flow returns to Step 91. If there is data to receive, Step 92 checks the format of the data. Namely, if the format of the data agrees with a predetermined one in Step 92, Step 93 transmits the data as it is at a frequency of f through a communication control mechanism 23 and transmission mechanism 24. On the other hand, if Step 92 determines that the format of the data does not agree with the predetermined format, the data transmitted from the radio communication terminal 1 at the frequency F is ignored, and the flow returns to Step 91.

Next, examples of radio control modules used for the multiple-terminal communication system according to the invention will be explained. The radio control module (hereinafter referred to as the module) is attached to an RS-232C interface of a communication terminal equipment such as a personal computer, to provide a radio communication function for the personal computer, i.e., the communication terminal equipment. The radio control module is formed as a kind of a very-weak-power radio station prescribed by the Japanese Radio Law. The RS-232C interface and conventional module have been already explained with reference to FIGS. 20A to 22.

Figure 13:
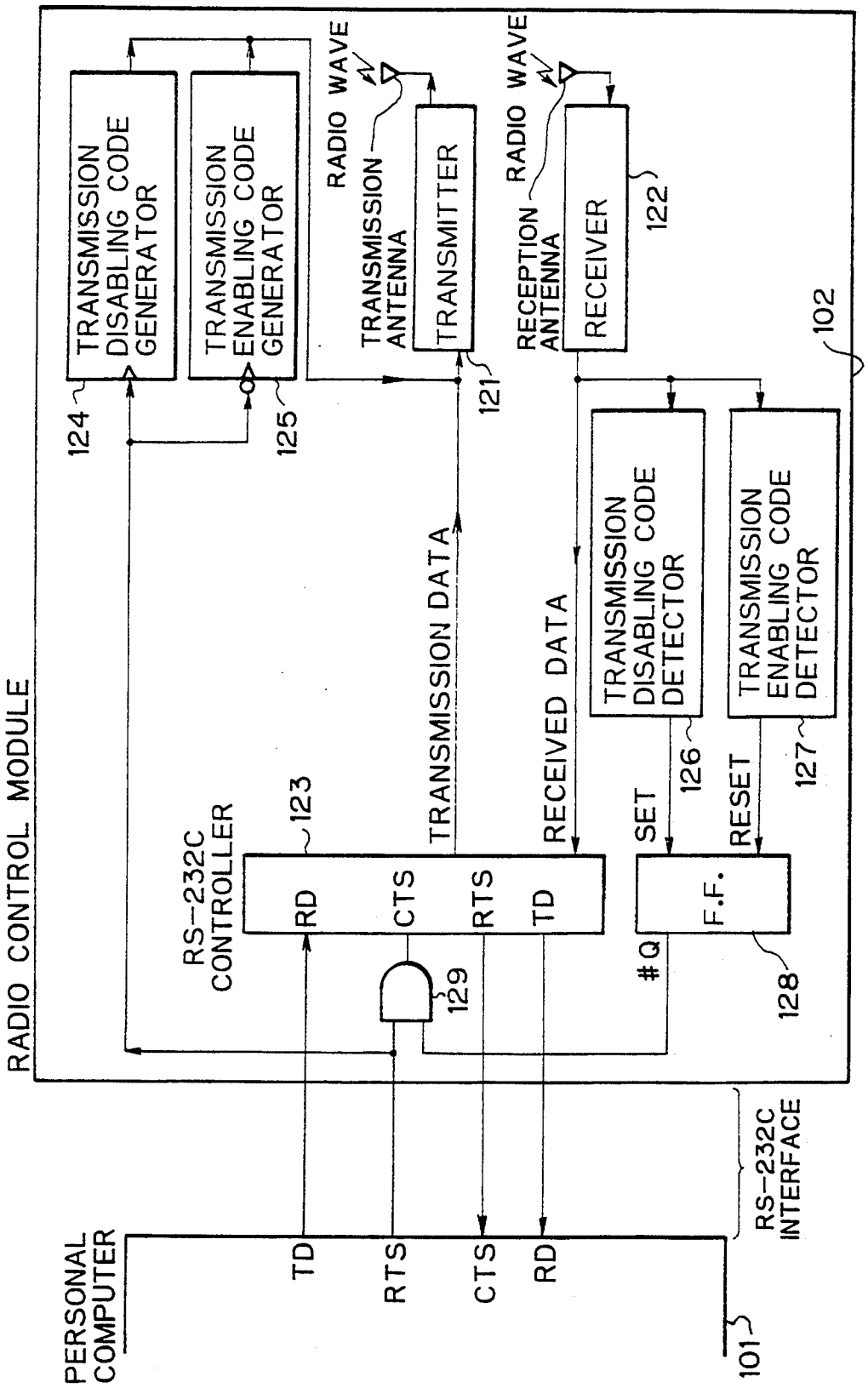
FIG. 13 is a block diagram showing an example of a radio control module for a multiple-terminal communication system according to the invention.

FIG. 13 is a block diagram showing an example of a radio control module for the multiple-terminal communication system according to the invention, and FIG. 14 is a diagram explaining an operation sequence of the radio control module shown in FIG. 13.

In FIG. 13, the radio control module 102 comprises a transmitter 121, a receiver 122, an RS-232C controller (hereinafter referred to as the controller) 123, a transmission disabling code generator 124, a transmission enabling code generator 125, a transmission disabling code detector 126, a transmission enabling code detector 127, a flip-flop 128, and an AND gate 129. The module 102 is connected to a personal computer 101 through an RS-232C interface.

The transmission disabling code generator 124 has a function of generating a transmission disabling code upon detecting a data transmission request signal. The transmission enabling code generator 125 has a function of generating a transmission enabling code upon detecting a data transmission request end signal. The transmission disabling code detector 126 has a function of detecting a transmission disabling code, and the transmission enabling code detector 127 has a function of detecting a transmission enabling code.

The flip-flop (F.F.) 128 receives signals from the transmission disabling code detector 126 and transmission enabling code detector 127, and has a state storing function of storing a present state, i.e., a transmission disabled state or a transmission enabled state, of the receiver 122. The AND gate 129 is a gate for an RTS signal transferred from the personal computer 101 to the controller 123, and has a function of inhibiting the personal computer 101 from transmitting data. The AND gate 129 receives the RTS signal and an inverted output signal #Q of the flip-flop 128. The controller 123 is controlled according to a logical product of the inverted output of the flip-flop 128 and the RTS signal. A passing condition of the AND gate 129 is that the receiver 122 is in the transmission enabled state. The signal #Q represents an inverted level of a signal Q.

An operation of the radio control module will be explained with reference to FIG. 14. Reference numerals (1) to (7) in FIG. 14 correspond to item numbers (1) to (7) used in the following explanations. A suffix "a" is added to the reference numeral of each part located at a transmitting end, while a suffix "b" is added to the reference numeral of each part located at a receiving end. For example, a personal computer located at the transmitting end is indicated as "101a," and that at the receiving end as "101b."

(1) When data is provided, the personal computer 101a at the transmitting end activates an RTS signal line, i.e., sets the signal line to "1."

(2) An RS-232C controller 123a of a radio control module 102a at the transmitting end detects the activated RTS line, and if the module 102a is ready, the module 102a activates a CTS signal line to reply the personal computer 101a. A transmission disabling code generator 124a also detects the activation and transmits a transmission disabling code to the receiving end through a transmitter 121a.

(3) A module 102b at the receiving end receives the transmission disabling code through a receiver 122b, which transfers the received data to a controller 123b and two detectors 126b and 127b. Upon detecting the transmission disabling code, the transmission disabling code detector 126b sets a state storing flip-flop 128b. According to the output (output signal) #Q of the flip-flop 128b, a CTS input of the controller 123b is blocked, and the receiving end is put in a transmission disabled state.

(4) At the transmitting end, the personal computer 101a starts, after receiving the RTS signal from the module 102a, transmitting actual data through the transmitter 121a.

(5) After completely transmitting the data, the personal computer 101a inactivates the RTS signal, i.e., sets the signal to "0."

(6) Upon detecting the inactivated RTS signal, the module 102a at the transmitting end inactivates the CTS signal to the personal computer 101a, and transmits a transmission enabling signal to the module 102b at the receiving end.

(7) When the transmission enabling code detector 127b of the module 102b at the receiving end detects the transmission enabling signal, the flip-flop 128b is reset to release the CTS input, and the module 102b is put in a transmission enabled state.

Figure 15B:
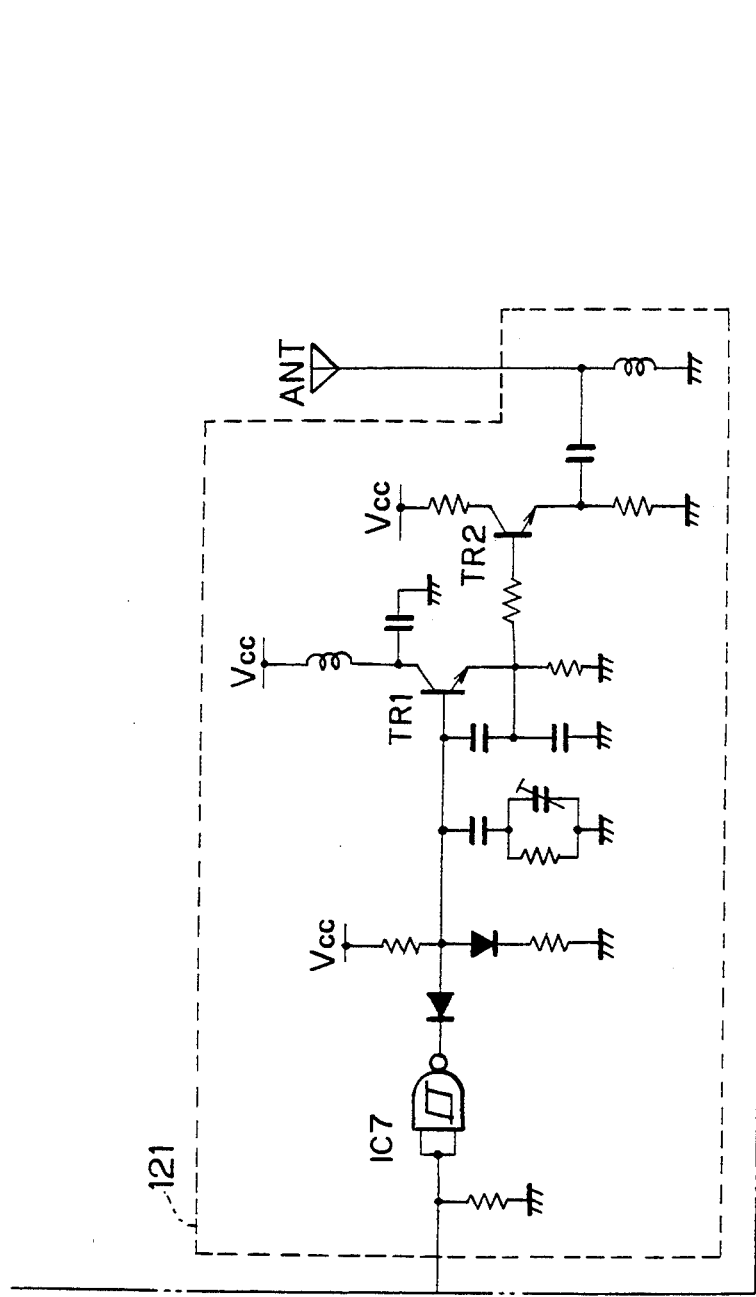
Figure 15C:
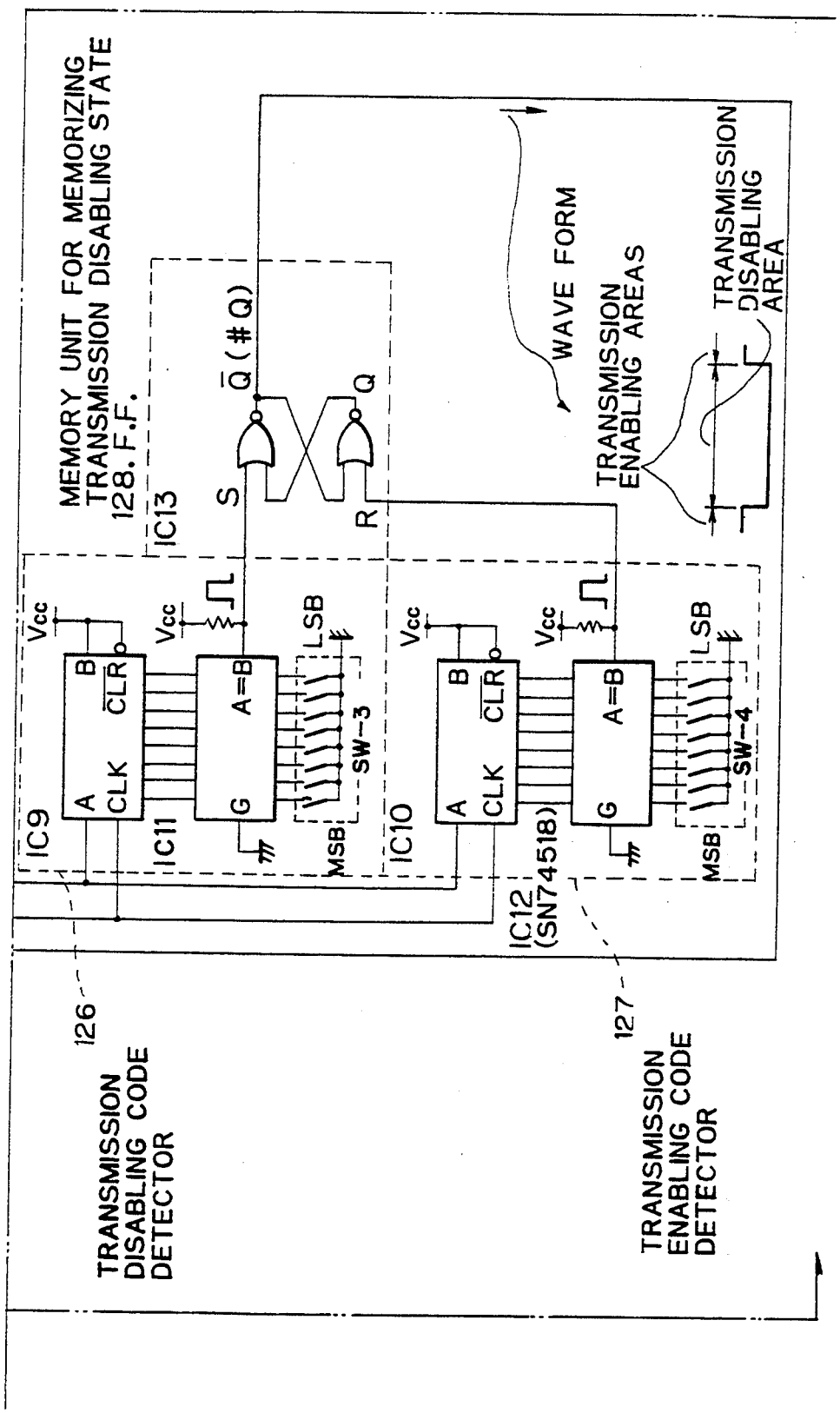
Figure 15D:
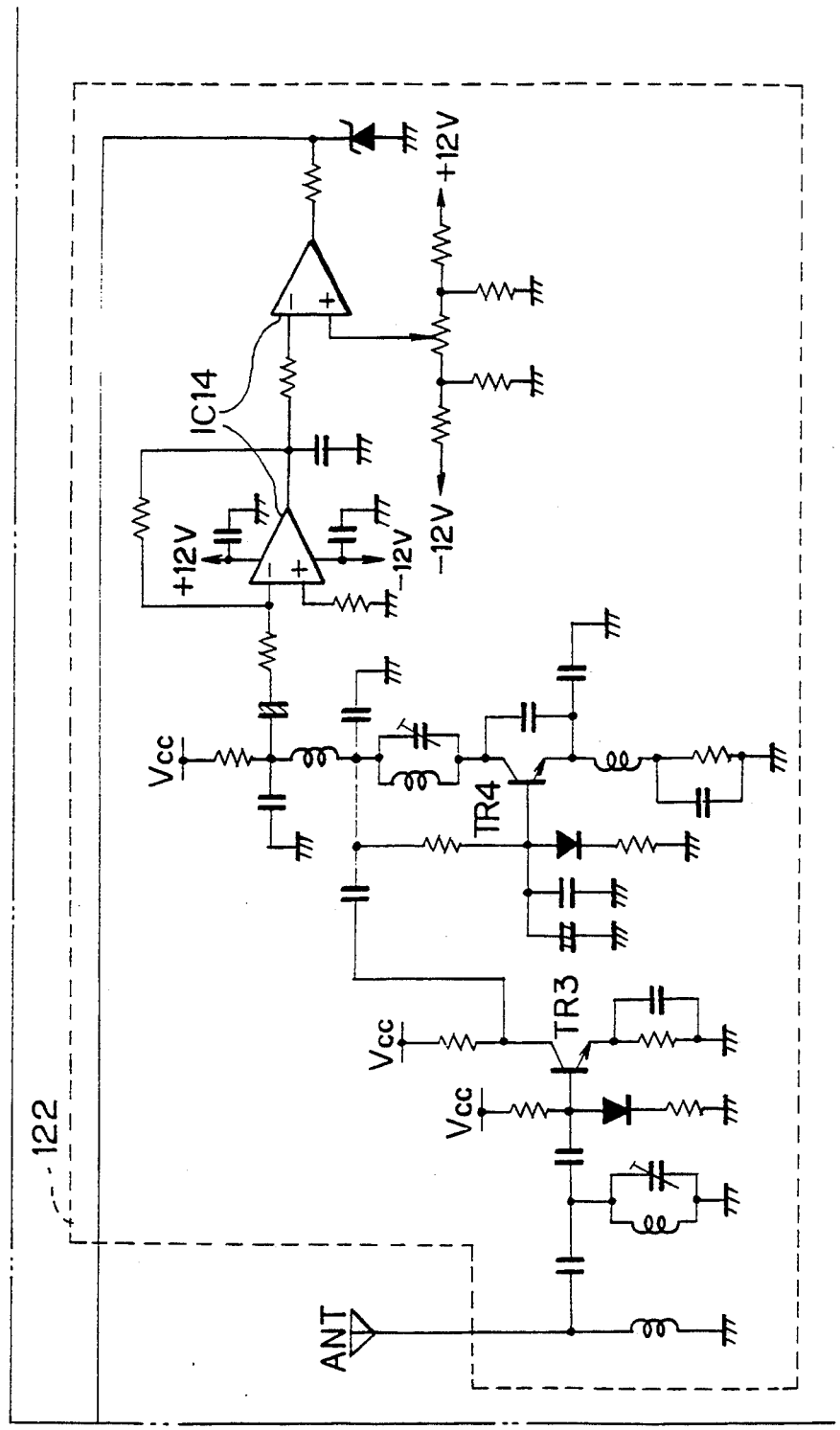

FIG. 15 is a circuit diagram showing an example of the radio control module of FIG. 13, and FIGS. 15A to 15D show parts of the circuit diagram of FIG. 15. Note, the configuration of the radio control module of FIG. 15 (FIGS. 15A to 15D) basically corresponds to that of FIG. 13, but RS-232C TTL-level converter circuit 130 and transmission request detection circuits 131a and 131b are added to the radio control module of FIG. 13. Further, the same reference numerals of FIGS. 13 and 15 denote the same portions, and the explanations of the same portions of FIG. 13 are omitted.

In FIG. 15 (FIG. 15A), the RS-232C TTL-level converter circuit 130 is used to convert a level of each of the signals output from the personal computer 101 through the RS-232C interface to a TTL-level used in the radio control module 102. Further, the transmission request detection circuit 131a is used to detect a start timing (transmitting start) of a transmission request signal (RTS signal), and the transmission request detection circuit 131b is used to detect an end timing (transmitting end) of the RTS signal.

The RS-232C controller 123 is used to transfer signals between the personal computer 101 and the radio control module 102. Namely, as described above, the controller 123 has functions of replying a CTS signal to the personal computer 101 by detecting the RTS signal (for example, transmitting start or transmitting end of the RTS signal), transferring the transmission data TDX to the transmitter 121 by receiving and processing the transmission data TDX, transferring signal RDX to the personal computer 101 by receiving and processing the data from the receiver 122, and the like.

In this embodiment, the transmission or reception data are not processed and directly passed through the RS-232C controller 123. Note, in the RS-232C controller 123, various processes (for example, an error detection process, error collection process, and data compression process) can be carried out. Further, in the reply operation against the RTS signal of the general equipments, the RTS signal is returned as the CTS signal, but in this embodiment, the CTS signal is delayed about 20 msec. by a delay circuit DL to obtain a specific time to generate a transmission disabling code or transmission enabling code.

Further, a transmission request detection unit is constituted by the transmission request detection circuit 131a including an integrated circuit IC2 and the transmission request detection circuit 131b including an integrated circuit IC3. The transmission request detection circuits 131a and 131b monitor the RTS signal output from the personal computer 101, and detect the change of the RTS signal. Namely, the transmission request detection circuit 131a detects a transmitting start by triggering the IC2 at a leading edge of the RTS signal, and the transmission request detection circuit 131b detects a transmitting end by triggering the IC3 at a trailing edge of the RTS signal. Note, in this RTS signal, when starting the transmission request, the level of the RTS signal changed from a low level "L" to a high level "H", and conversely, when ending the transmission request, the level of the RTS signal changed from the high level "H" to the low level "L". Further, both of the detection signals of the transmission request detection circuits 131a and 131b are negative pulse signals.

As shown in FIG. 15 (FIG. 15A), the transmission disabling code generator 124 comprises a shift register (integrated circuit) IC4 synchronizing with an external clock signal and a switch SW-1. In the shift register IC4, data (which is ordinarily at "0"; low level) of a serial input terminal S-IN is output to a serial output terminal S-OUT in accordance with the clock signal. Nevertheless, when inputting a start timing detection signal of the transmission request which is output from the IC2, a transmission disabling code which is previously set on the switch SW-1 is output to the serial output terminal S-OUT. Concretely, the transmission disabling code is specified to a 8-bits code "11111111", but this transmission disabling code can also specified to an optional bits code not appearing at transmission data.

Similarly, the transmission enabling code generator 125 also comprises a shift register (integrated circuit) IC5 synchronizing with an external clock signal and a switch SW-2. In the shift register IC5, data (which is ordinarily at "0"; low level) of a serial input terminal S-IN is output to a serial output terminal S-OUT in accordance with the clock signal. Nevertheless, when inputting an end timing detection signal of the transmission request which is output from the IC3, a transmission enabling code which is previously set on the switch SW-2, is output to the serial output terminal S-OUT. Concretely, the transmission disabling code is specified to a 8-bits code "11111110", but this transmission disabling code can also specified to an optional bits code not appearing at transmission data.

The two pulse strings generated by the code generator 124 and 125 are input to a first OR gate (IC6), and an output of the first OR gate is input to a second OR gate (IC6) and ORed with the transmission data. In the two OR gates (IC6), an output of the IC6 is ordinarily the same as the transmission data, and when changing the transmission request signal RTS, the transmission enabling code or transmission disabling code is output. Note, as described above, the delay circuit DL of the RS-232C controller 123 is used to avoid the transfer of the transmission data output from the personal computer 101 during the time from detecting the transmission request signal to outputting the transmission disabling code.

As shown in FIG. 15 (FIGS. 15B and 15D), the transmitter 121 is CW-radio transmitter including a first transistor TR1 for an oscillator and a second transistor TR2 for a power amplifier, and the operation of the transmitter 121 is controlled, or switched by the output of the IC6. The receiver 122 is constituted by a third transistor TR3 for a radio frequency amplifier, a fourth transistor TR4 for a super-regenerative receiver, and an integrated circuit IC14 for a waveform shaping circuit. Note, data received by the super-regenerative receiver (IC14) are transferred to the personal computer 101, and the data also transferred to the transmission disabling code detector 126 and the transmission enabling code detector 127 and used to generate control signals of the radio control module 102.

As shown in FIG. 15 (FIG. 15C), the transmission disabling code detector 126 is constituted by a shift register IC9, a coincidence detection circuit IC11, and a switch SW-3. In the transmission disabling detector 126, the received data are orderly taken in the shift register IC9 by the external clock, and then the data taken in the shift register IC9 are compared with the transmission disabling code set on the switch SW-3 by the coincidence detection circuit IC11. Note, when the transmission disabling code is transferred from the receiver 122, a coincidence signal appears at the output of the coincidence detection circuit IC11. Further, the transmission disabling code should be determined to be the same transmission disabling code of the transmission side. In addition, a clock signal obtained by super-regenerating the received data can be used as the external clock signal.

As shown in FIG. 15 (FIG. 15C), the transmission enabling code detector 127 is constituted by a shift register IC10, a coincidence detection circuit IC12, and a switch SW-4. In the transmission enabling detector 127, the received data are orderly taken in the shift register IC10 by the external clock, and then the data taken in the shift register IC10 are compared with the transmission enabling code set on the switch SW-4 by the coincidence detection circuit IC12. Note, when the transmission enabling code is transferred from the receiver 122, a coincidence signal appears at the output of the coincidence detection circuit IC12. Further, the transmission disabling code should be determined to be the same transmission disabling code of the transmission side. In addition, a clock signal obtained by super-regenerating the received data can be used as the external clock signal.

The output signals of the transmission disabling detector 126 and the transmission enabling detector 127 are input to a transmission disabling state storing unit constituted by a flip-flop (F.F.) 128. In this embodiment, a reset-set flip-flop (RS-F.F.) constituted by an integrated circuit IC13 is used as the flip-flop 128, the pulse signal is supplied to a set terminal S when the transmission disabling code is detected, and the pulse signal is supplied to a reset terminal when the transmission enabling code is detected. Note, an output (output signal) Q of the flip-flop indicates that the own radio control module 102 is at the transmission disabling state. Further, the flip-flop F.F. is at an initial state, i.e., an unsteady state at the time of switching ON, and thus the flip-flop is reset by the transmission enabling code transferred from the external of the radio control module. Nevertheless, instead of transferring the transmission enabling code from the external, a reset circuit can be provided to the flip-flop F.F.

As shown in FIG. 15 (FIG. 15A), in this embodiment, the transmission disabling unit 129 is constituted by an AND gate IC8, wherein an inverted RTS signal is transferred to an input of the AND gate 129, and an output (output signal) #Q of the transmission disabling state storing unit (F.F.) 128 is supplied to the other input of the AND gate 129. Note, the RTS signal is transferred through the AND gate 129 only when the output signal #Q is at a high level "H". Therefore, in the case that the signal #Q is at a low level "L", the RTS signal is not transferred to the RS-232C controller 123 when the RTS signal is transferred, and thus the CTS signal is not transferred from the radio control module 102 to the personal computer 101.

Next, an operation of the radio control module of FIG. 15 will be explained.

First, when transmission signals, or data is provided, the personal computer 101 generates an RTS signal line. In this case, when the radio control module is at the transmission disabling state, the transmission disabling unit (AND gate) 129 is at a cut-off state, and thus the RTS signal cannot pass through the AND gate 129, so that data cannot be transmitted. Conversely, when the radio control module is at the transmission enabling state, the RTS signal passes through the AND gate 129 and supplied to the RS-232C controller and delayed by the delay circuit DL, and the STC signal is returned to the personal computer 101 after a specific delay time, so that the personal computer starts to transmit the data. Note, the transmission data TXD are transferred to the other modules through the RS-232C controller 123, the IC6 (OR gates), and transmitter 121.

In the radio control module 102, during delaying the RTS signal, the following operations are carried out. First, a leading edge of the RTS signal is detected by the transmission request detection circuit 131a, and the transmission request detection circuit 131a outputs a signal indicating the generation of the transmission request, the transmission disabling code generator 124 outputs pulse strings thereby, and pulse strings are transmitted to the other modules through the transmitter 121. After this, signals output from the personal computer 101 are transferred by the delayed CTS signal.

In each of the other modules, the data received by the receiver 122 are transferred to the other personal computer 101, and further the transmission disabling code is detected by the transmission disabling code detector 126, so that the flip-flop 128 is set. Note, the AND gate 129 is at cut-off state by the output signal #Q of the flip-flop 128, and thus the other modules are at the transmission disabling states.

Next, when completing the transmission, or when the operations of the transmitting module are completed, the RTS signal output from the personal computer 101 is trailed, and a trailing edge of the RTS signal is detected by the transmission request detection circuit 131b. Further, the transmission enabling code generator 125 is activated and the transmission enabling pulse strings are transmitted to the other modules 102 through the transmitter 121.

In each of the other radio control modules 102, the transmission enabling code detector 127 detects the transmission enabling code, and the flip-flop 128 is reset, so that the RTS signal output from the personal computer 101 is passed through the AND gate 129.

FIG. 16 is a block diagram showing another example of a radio control module for a multiple-terminal communication system according to the invention, and FIG. 17 is a diagram explaining an operation sequence of the radio control module of FIG. 16. In FIG. 16, reference numeral 221 denotes a timer, 222 a data detector, and 223 an OR gate. In FIG. 16, parts having the same reference numerals as those of FIG. 13 provide like functions, and therefore, their explanations will not be repeated.

When a data transmission request is detected, the timer 221 starts a time measuring operation, and terminates the operation upon detecting a data transmission request end. The timer 221 produces a time-out signal after a predetermined time. Even during the time measuring operation, the timer 221 can be reset according to an external reset input.

The data detector 222 has an input branched from a data path from a personal computer 101 and functions to detect a generation of data to be transmitted.

The OR gate 223 activates a transmission enabling code generator 125 according to the data transmission request signal and the time-out signal of the timer 221.

Referring to FIG. 17, an operation of the radio control module of FIG. 16 will be explained. Reference numerals (1) to (7) in FIG. 17 correspond to item numbers (1) to (7) used in the following explanations. Similar to the previous example, a suffix "a" is added to the reference numeral of each part located at a transmitting end, while a suffix "b" is added to the reference numeral of each part located at a receiving end.

(1) When data is generated, a personal computer 101a at the transmitting end activates an RTS line.

(2) A controller 123a of a module 202a at the transmitting end detects the activated RTS line, and if the module 202a is ready, the module 202a activates a CTS line to reply the personal computer 101a. A transmission disabling code generator 124a also detects the activation, and transmits a transmission disabling code to the receiving end.

(2)-2 The timer circuit 221a also detects the transmission request and starts a time measuring operation. When detecting an RTS signal of 0 as shown in (5) of FIG. 17, the timer 221a stops the time measuring operation.

(3) A receiver 122b of a module 202b at the receiving end receives the transmission disabling signal, which is transferred to a controller 123b and two detectors 126b and 127b. When the transmission disabling code detector 126b detects the transmission disabling code, a state storing flip-flop 128b is set. According to an output #Q of the flip-flop 128b, a CTS input of the controller 123b is blocked, and the receiving end is put in a transmission disabled state.

(4) At the transmitting end, the personal computer 101a starts, after receiving the RTS signal from the module 202a, transmitting actual data through a transmitter 121a.

(5) If data is not produced during a predetermined time as shown in (5) of FIG. 17, the timer 221a provides a time-out signal, which is ORed with the RTS signal in the OR gate 223a. As a result, it becomes, apparently, as if the data transmission has been completed and the personal computer 101a has inactivated the RTS signal.

(6) Accordingly, the module 202a at the transmitting end transmits a transmission enabling signal to the module 202b at the receiving end.

(7) Upon receiving the transmission enabling signal, the flip-flop 128b at the receiving end is reset to release the CTS input of the controller 123b, and the receiving end is put in a transmission enabled state.

Figure 18:
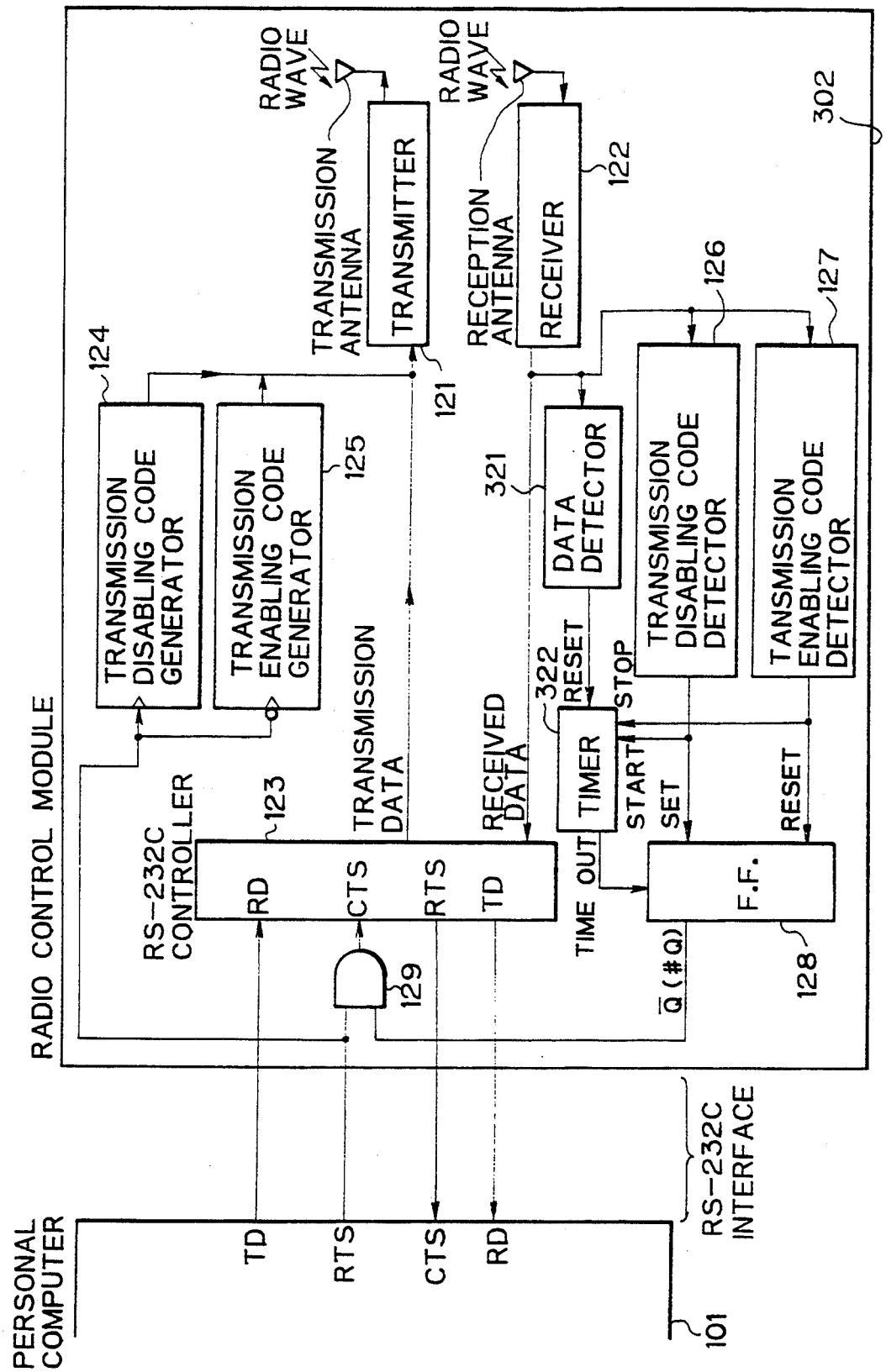
FIG. 18 is a block diagram showing another example of a radio control module for a multiple-terminal communication system according to the invention.
Figure 19:
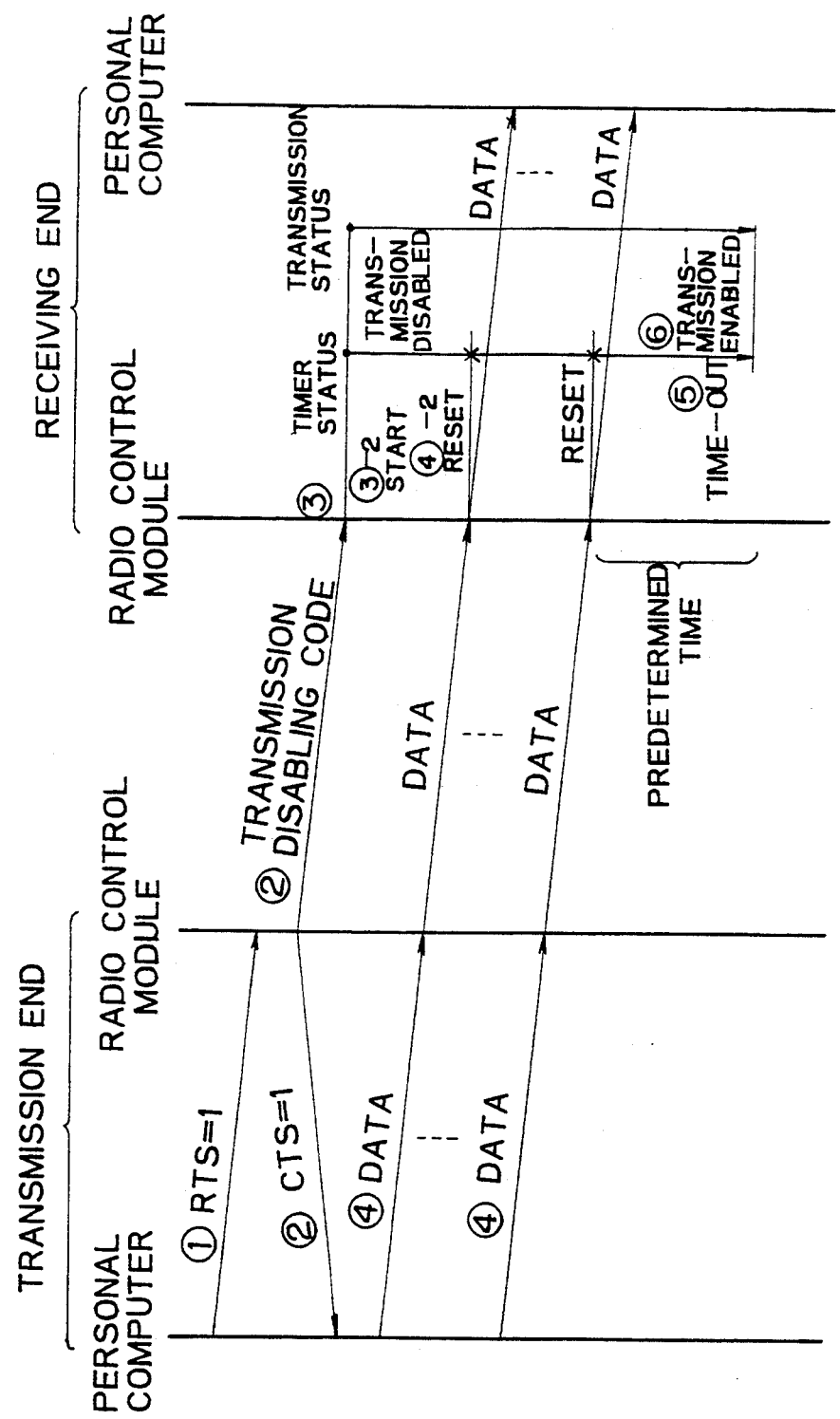
FIG. 19 is a diagram explaining an operation sequence of the radio control module of FIG. 18.

FIG. 18 is a block diagram showing another example of a radio control module for a multiple-terminal communication system according to the invention, and FIG. 19 is a diagram explaining an operation sequence of the radio control module of FIG. 18. In FIG. 18, reference numeral 321 denotes a data detector, and 322 a timer. In this figure, parts having the same reference numerals as those of FIG. 16 provide like functions, and therefore, their explanations will not be repeated.

The data detector 321 has an input branched from a data path from a receiver 122 and functions to detect received data.

The timer 322 starts a time measuring operation according to an output of a transmission disabling code detector 126 and stops the operation according to an output of a transmission enabling code detector 127. After a predetermined time, the timer 322 provides a time-out signal. Even during the time measuring operation, the timer 322 can be set to 0 according to an external reset input.

Referring to FIG. 19, an operation of the radio control module will be explained. Reference numerals (1) to (6) in FIG. 19 correspond to item numbers (1) to (6)

used in the following explanations. Similar to the previous example, a suffix "a" is added to the reference numeral of each part located at a transmitting end, while a suffix "b" is added to the reference numeral of each part located at a receiving end.

(1) When data is generated, a personal computer 101a at the transmitting end activates an RTS line.

(2) A controller 123a of a module 302a at the transmitting end detects the activated RTS line, and if the module 302a is ready, the module 302a activates a CTS line to reply the personal computer 101a. A transmission disabling code generator 124a also detects the activation and transmits a transmission disabling code to the receiving end.

(3) A receiver 122b of a module 302b at the receiving end receives the transmission disabling signal, which is transferred to a controller 123b and three detectors 126b, 127b, and 321b. When the transmission disabling code detector 126b detects the transmission disabling code, a state storing flip-flop 129b is set. Then, an output #Q of the flip-flop 129b blocks a CTS input of the controller 123b, and the receiving end is put in a transmission disabled state.

(3)-2 According to the transmission disabling code from the transmission disabling code detector 126b, the timer 322b starts a time measuring operation.

(4) At the transmitting end, the personal computer 101a starts, upon receiving the RTS signal from the module 302a, transmitting actual data through a transmitter 121a.

(4)-2 When the data is transmitted, the data detector 321b at the receiving end detects the data and generates a data detected signal, according to which the timer 322b is reset.

(5) If no data is generated during a predetermined time as shown in (5) of FIG. 19, the timer 322b generates a time-out signal, which clears the flip-flop 128b. As a result, the output #Q allows a RTS signal to be transmitted to the controller 123b through an AND gate 129b.

(6) Then, the receiving end will be able to transmit data.

The radio control modules shown in FIGS. 13 to 19 can be attached not only to personal computers but also to various kinds of computers and office automation equipment such as word processors and work stations which have an RS-232C interface. A connection between the radio control module and the personal computer is not limited to the RS-232C interface. Each of the embodiments shown in FIGS. 1 to 12 is applicable for any one of the radio control modules shown in FIG. 13 to 19. For example, in Step 75 of FIG. 11, actually transmitted data (a transmission disabling code) may be stored in the radio control module or in a memory (a buffer) in the personal computer, and the data stored in the memory may be compared with an echo back of the transmitted transmission disabling code received and monitored by its own terminal. Step 76 of FIG. 11 may be performed with use of a random number table disposed in the personal computer or the radio control module.

As explained above in detail, the multiple-terminal communication system of the invention transmits a transmission disabling code from one terminal, for disabling data transmission of the other terminals before transmitting data from the one terminal, and provides, after completely transmitting the data from the one terminal, a transmission enabling code for canceling the disabled states of the other terminals.

In this way, the multiple-terminal communication system according to the invention is characterized by the transmission disabling and enabling control in radio communications. As mentioned above, the RS-232C interfaces are widely used for connecting DTEs such as personal computers with radio units (DCEs), and the invention is realized by attaching a radio control module to the RS-232C interface.

Namely, the transmission enabling and disabling control of the invention works such that, when data transmission of one terminal is disabled by another terminal, a radio unit (DCE) of the one terminal does not provide a CTS signal to a personal computer (DTE) of the one terminal, and when the disabled state is canceled, the DCE provides the DTE with the CTS signal. The same control is carried out in each terminal when a time-out situation occurs in the terminal.

With this control, data is smoothly and correctly communicated between a plurality of terminal equipments.

Many widely differing embodiments of the present invention may be constructed without departing from the spirit and scope of the present invention, and it should be understood that the present invention is not limited to the specific embodiments described in this specification, except as defined in the appended claims.

We claim:

1. A multiple-terminal communication equipment, comprising a system comprising data communication means for performing data transmission, information processing means, coupled to said communication means, for processing the data, and data input/output means, coupled to said processing means, for inputting and outputting the data, said system realizing radio communication between at least two terminals by transmitting, before transmitting the data from one terminal, a transmission disabling code for disabling data transmission of other terminals, and after completely transmitting the data from said one terminal, a transmission enabling code for canceling the transmission disabled states of the other terminals.

2. A multiple-terminal communication equipment as claimed in claim 1, further comprising means for determining when transmission data has not been generated for a predetermined time and said transmission enabling code is transmitted when no transmission data is generated for the predetermined time during a data transmission operation.

3. A multiple-terminal communication equipment as claimed in claim 1, wherein said transmission disable state of said own multiple-terminal communication equipment is canceled when there is no data to receive for a predetermined time after the reception of said transmission disabling code or last data, during a data receiving operation.

4. A multiple-terminal communication equipment as claimed in claim 1, wherein said data communication means uses the same frequency for data transmission and reception.

5. A multiple-terminal communication equipment as claimed in claim 1, wherein said data communication means uses different frequencies for data transmission and reception, respectively.

6. A radio communication system having a plurality of multiple-terminal communication equipment units, each of said multiple-terminal communication equipment units comprising data communication means for performing data transmission, information processing means, coupled to said communication means, for processing the data, and data input/output means, coupled to said processing means, for inputting and outputting the data, each said equipment unit realizing radio communication between at least two terminals by transmitting, before transmitting the data from one terminal, a transmission disabling code for disabling data transmission of other terminals, and after completely transmitting the data from said one terminal, a transmission enabling code for canceling the transmission disabled states of the other terminals.

7. A radio communication system as claimed in claim 6, further comprising means for determining when transmission data has not been generated for a predetermined time and said transmission enabling code is transmitted when no transmission data is generated for the predetermined time during a data transmission operation.

8. A radio communication system as claimed in claim 6, wherein the transmission disable state of said multiple-terminal communication equipment unit is canceled by said communication means when there is no data to receive for a predetermined time after the reception of said transmission disabling code or last data, during a data receiving operation.

9. A radio communication system as claimed in claim 6, wherein said data communication means uses the same frequency for data transmission and reception.

10. A radio communication system as claimed in claim 9, wherein each of said multiple-terminal communication equipment units transmits data at a predetermined frequency, and further comprises reception means for receiving and monitoring the transmitted data at the predetermined frequency, and wherein each of said multiple-terminal communication equipment units compares the received data with the transmitted data, and evaluates communication conditions between said multiple-terminal communication equipment unit and the other multiple-terminal communication equipment units.

11. A radio communication system as claimed in claim 10, wherein each of said multiple-terminal communication equipment units further comprises a unique random number table, and determines a delay time according to values in said unique random number table if interference with another multiple-terminal communication equipment unit is detected, and retransmits data after the delay time.

12. A radio communication system as claimed in claim 9, wherein each of said multiple-terminal communication equipment units receives checking data transmitted from itself or another multiple-terminal communication equipment unit while no data communication is being carried out between said multiple-terminal communication equipment units, and according to the checking data, evaluates data transmission conditions between said multiple-terminal communication equipment unit and the other multiple-communication units.

13. A radio communication system as claimed in claim 6, wherein said data communication means uses different frequencies for data transmission and data reception, respectively.

14. A radio communication system as claimed in claim 13, wherein said multiple-terminal communication equipment units comprise:

a plurality of radio communication terminals operating at a first frequency as a transmission frequency and a second frequency, which is different from said first frequency, as a reception frequency, any one of said plurality of radio communication terminals transmitting a radio wave at said first frequency; and a repeater receiving the radio wave transmitted at said first frequency from any one of said radio communication terminals, and transmitting data contained in said first frequency as is or after processing the data, at said second frequency.

15. A radio communication system as claimed in claim 14, wherein any one of said radio communication terminals transmits data only when a data transmission request is provided and the other terminals are not transmitting data.

16. A radio communication system as claimed in claim 14, wherein said repeater receives the data, processes the data or leaves the data as is, and exchanges the data with another communication system or terminal through one of a wired network and a radio network.

17. A radio communication system as claimed in claim 14, wherein any one of said radio communication terminals compares transmitted data with data returned from said repeater during data transmission, and evaluates communication conditions between said own radio communication terminal and said repeater.

18. A radio communication system as claimed in claim 17, wherein each of said radio communication terminals has a unique random number table, determines a delay time according to values in said unique random number table if interference with another terminal is detected, and again transmits data after the delay time.

19. A radio communication system as claimed in claim 14, wherein each of said radio communication terminals receives checking data transmitted from itself, another radio communication terminal, or said repeater while no data communication is being carried out between said radio communication terminals, and according to the checking data evaluates data transmission conditions between said radio communication terminal and said repeater.

20. A radio communication system as claimed in claim 14, wherein said repeater evaluates data from any one of said radio communication terminals, and if the data disagrees with a prescribed format, ignores and does not relay the data.

21. A radio control module carrying out radio communication between at least two terminals, said radio control module having interface means attached to one of the terminals for data communication, transmission means for radioing data, and reception means for receiving radioed data, said radio control module comprising:

a transmitter portion comprising transmission request signal detecting means, transmission disabling code generating means, and transmission enabling code generating means; and a receiver portion comprising transmission disabling code detecting means, transmission enabling code detecting means, transmission disabled state storing means, and transmission disabling means, said radio control module transmitting, before transmitting data, a transmission disabling code disabling data transmission of other radio control modules, and after completely transmitting the data, a transmission enabling code for canceling the disabled states of the other radio control modules.

22. A radio control module as claimed in claim 21, wherein said transmitter portion further comprises data detecting means and timer means, for enabling transmission when a data transmission interval of said transmitter portion exceeds a predetermined period.

23. A radio control module as claimed in claim 21, wherein said receiver portion further comprises data detecting means and timer means, for enabling transmission when a data reception interval of said receiver portion exceeds a predetermined period.

24. A radio control module as claimed in claim 21, wherein said radio control module is used as a radio communication terminal.

25. A radio control module as claimed in claim 21, wherein said transmission means and reception means operate at the same frequency.

26. A radio control module as claimed in claim 21, wherein said transmission means and reception means operate at different frequencies, respectively.

27. A radio control module as claimed in claim 26, wherein said radio control module is used as a repeater.

28. A radio control module as claimed in claim 27, wherein said radio control module receives a radio wave transmitted at said first frequency from a radio communication terminal, processes data contained in said first frequency or leaving the data as it is, and transmits the data at said second frequency.

* * * * *

UNITED STATES PATENT AND TRADEMARK OFFICE
CERTIFICATE OF CORRECTION

PATENT NO.  : 5,347,545
DATED       : September 13, 1994
INVENTOR(S) : Tomoyuki ISHII et al.

It is certified that error appears in the above-indentified patent and that said Letters Patent is hereby corrected as shown below:

Column 1, line 26, change "equipments" to

--equipment--;

line 32, after "equipment" insert

--units--;

line 58, delete "why";

line 64, after "equipment" insert

--units--.

Column 2, line 51, after "equipment" insert

--units--;

line 53, after "ment" insert

--units--;

line 59, after "ment" insert

--units--;

lines 62, 65 and 66, after "equipment"

insert --units--.

UNITED STATES PATENT AND TRADEMARK OFFICE
CERTIFICATE OF CORRECTION

PATENT NO. : 5,347,545
DATED : September 13, 1994
INVENTOR(S) : Tomoyuki ISHII et al.

It is certified that error appears in the above-indentified patent and that said Letters Patent is hereby corrected as shown below:

```
Column 8, line 1, change "ment" to --ments--;

line 2, change "ment" to --ments--;

line 3, after "equipment" insert

--units--.

Column 13, line 44, change "6T" to --δT--.
```

Signed and Sealed this

Fourteenth Day of February, 1995

Attest:

BRUCE LEHMAN

Attesting Officer     *Commissioner of Patents and Trademarks*